US011080088B2

(12) United States Patent
Thiyagarajah et al.

(10) Patent No.: US 11,080,088 B2
(45) Date of Patent: Aug. 3, 2021

(54) POSTED INTERRUPT PROCESSING IN VIRTUAL MACHINE MONITOR

(71) Applicant: Intel Corporation, Santa Clara, CA (US)

(72) Inventors: Arumugam Thiyagarajah, Folsom, CA (US); Rajesh Sankaran, Portland, OR (US); Dharmendra Thakkar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 16/226,367

(22) Filed: Dec. 19, 2018

(65) Prior Publication Data

US 2019/0121658 A1    Apr. 25, 2019

(51) Int. Cl.
*G06F 9/48*     (2006.01)
*G06F 9/455*    (2018.01)
*G06F 9/54*     (2006.01)

(52) U.S. Cl.
CPC ........ *G06F 9/4812* (2013.01); *G06F 9/45533* (2013.01); *G06F 9/45558* (2013.01); *G06F 9/4881* (2013.01); *G06F 9/546* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 7,000,051 | B2 * | 2/2006 | Armstrong ............ G06F 9/5077 710/267 |
| 7,287,197 | B2 * | 10/2007 | Bennett ............... G06F 9/45533 714/38.13 |
| 8,566,492 | B2 | 10/2013 | Madukkarumukumana et al. |
| 8,843,683 | B2 | 9/2014 | Madukkarumukumana et al. |
| 9,110,699 | B2 * | 8/2015 | Bell ........................ G06F 9/5011 |
| 9,116,869 | B2 * | 8/2015 | Madukkarumukumana ................ G06F 13/24 |
| 9,952,987 | B2 | 4/2018 | Guddeti et al. |

(Continued)

OTHER PUBLICATIONS

Intel® Virtualization Technology for Directed I/O, Architecture Specification, pages (pp. 1, 5-11 to 5-16, and 9-42 to 9-43), Jun. 2018.

*Primary Examiner* — Ryan D. Coyer
(74) *Attorney, Agent, or Firm* — Nicholson De Vos Webster & Elliott LLP

(57) ABSTRACT

A processor includes a processor core, a processor cache to store reporting data structures including a queue structure, and an interrupt posting circuit coupled to the processor core and the processing cache. The interrupt posting circuit receives an interrupt request directed to a virtual processor (VP) of a virtual machine (VM) executed by the processor core. The VM is managed by a virtual machine monitor (VMM) executed by the processor core. The interrupt posting circuit determines the VP is in an inactive state and records the interrupt request in a first posted data structure allocated by the VMM for the VP in main memory coupled to the processor. The interrupt posting circuit updates location information stored in the reporting data structures based on recording the interrupt request in the first posted data structure to generate updated location information that identifies a location of the interrupt request.

24 Claims, 13 Drawing Sheets

(56) References Cited

U.S. PATENT DOCUMENTS

| | | | |
|---|---|---|---|
| 2007/0157197 A1* | 7/2007 | Neiger | G06F 9/4812 718/1 |
| 2008/0244571 A1* | 10/2008 | Bennett | G06F 9/45558 718/1 |
| 2010/0023666 A1* | 1/2010 | Mansell | G06F 9/45558 710/267 |
| 2010/0191889 A1* | 7/2010 | Serebrin | G06F 9/4812 710/269 |
| 2013/0159580 A1* | 6/2013 | Dong | G06F 9/48 710/266 |
| 2014/0047149 A1* | 2/2014 | Marietta | G06F 13/24 710/264 |
| 2014/0047150 A1* | 2/2014 | Marietta | G06F 9/5077 710/264 |
| 2016/0117190 A1 | 4/2016 | Sankaran et al. | |
| 2017/0206177 A1 | 7/2017 | Tsai et al. | |

* cited by examiner

POSTED INTERRUPT PROCESSING IN VIRTUAL MACHINE MONITOR

TECHNICAL FIELD

Embodiments of the disclosure relate generally to posted interrupt processing in a virtual machine monitor.

BACKGROUND

Virtualization creates one or more virtual machines (VM) on a host system. The host system includes underlying physical hardware resources and each VM acts like a physical computer system with an operating system and provides functionalities of the physical computer system virtually. A virtual machine monitor (VMM) (e.g., hypervisor) creates VMs on the host system's physical hardware and manages the VMs.

During operation, the host system may receive an interrupt request directed to a VM while the VM is in an inactive state and the host system may store the interrupt request. The VMM determines that the host system has stored the interrupt request, causes the VM to switch from an inactive state to an active state, and provides the interrupt request to the VM.

DESCRIPTION OF THE EMBODIMENTS

Figure 1A:
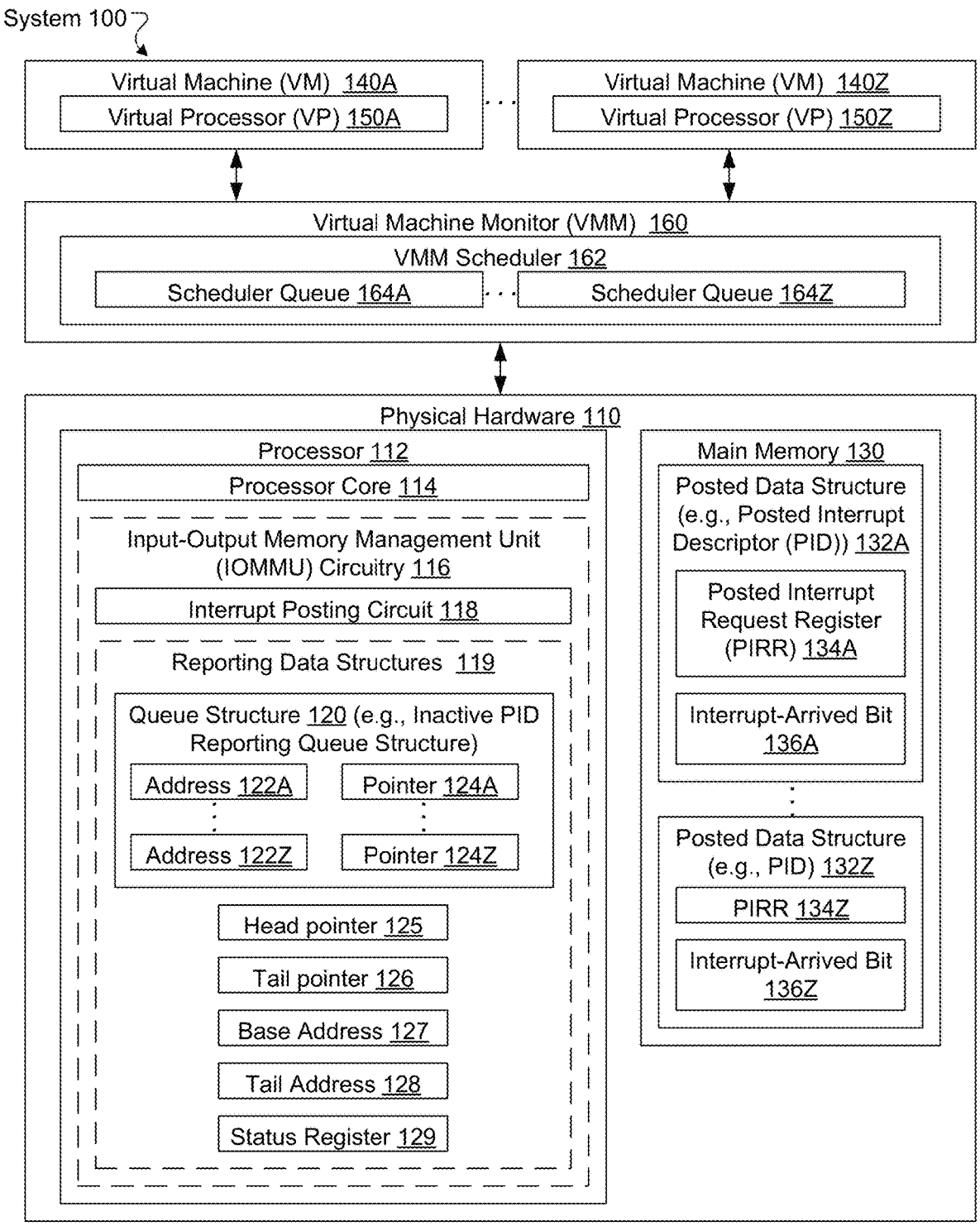
FIG. 1A illustrates a system including physical hardware, a VMM, and a VM, according to certain embodiments.

Described herein are technologies directed to posted interrupt processing in a VMM. A processor of a host system may receive an interrupt request targeting a VP of a VM executed by the processor and managed by a VMM executed by the processor. The processor may determine the VP is in an inactive state and may record the interrupt request in a posted data structure (e.g., posted interrupt descriptor (PID) structure) in main memory of the host machine. Conventionally, the VMM scans each posted data structure of the main memory to determine if any VPs need to be scheduled for handling interrupt requests. The more VPs a VM has, the more CPU cycles the VMM spends scanning the posted data structures to schedule VPs during each VMM scheduler phase. For example, the VMM scheduler may scan four double words (e.g., scanning a posted interrupt request register (PIRR) for each PID structure) for each VP to determine if each VP is to be scheduled for handling an interrupt request. CPU cycles are consumed in scanning a corresponding posted data structure (e.g., PIRR of the corresponding PID) of each VP and VMM processing time is used to schedule the VPs, thus reducing overall workload performance (e.g., on a highly utilized platform). In a platform (e.g., mobile platform) where battery life is a critical resource, the CPU cycles directly cause decreased battery life.

The devices, systems, and methods, as described herein provide accelerated processing of posted interrupt processing in a VMM. An interrupt posting circuit of a processor of the host system may receive an interrupt request targeting a VP of a VM, determine the VP is in an inactive state, and record the interrupt request in a posted data structure (e.g., PID) allocated by the VMM for the VP in main memory. The interrupt posting circuit may update location information stored in reporting data structures of the processor to generate updated location information that identifies a location of the interrupt request. The VMM may locate the interrupt request based on the updated location information.

In some embodiments, the interrupt posting circuit, to update the location information, updates one or more of a pointer or an address stored in the queue structure based on the recording of the interrupt request. The one or more of the pointer or the address identifies the location of the interrupt request. The VMM locates the interrupt request in the posted data structure by reading one or more of the pointer or the address in the queue structure.

In some embodiments, the interrupt posting circuit sets an interrupt-arrived bit in the posted data structure responsive to receiving the interrupt request and determining the VP is in the inactive state (e.g., and recording the interrupt request in the posted data structure). The interrupt posting circuit, to update the location information, may set a status register of the reporting data structures (e.g., responsive to determining that the queue structure is at maximum capacity or has overflowed) to indicate that each interrupt-arrived bit of the main memory is to be read by the VMM to locate the interrupt request. The VMM may determine that the status register of the queue structure is set and may read each interrupt-arrived bit (e.g., corresponding interrupt-arrived bit of each PID) in the main memory.

By updating location information stored in the reporting data structures of the processor based on recording the interrupt request in the posted data structure, CPU cycles may be reduced during posted interrupt processing and VMM scheduler evaluation. The VMM may determine the posted interrupts without scanning each posted data structure of the main memory. Instead of scanning four double words for each posted data structure, the VMM can locate the posted interrupts by reading the reporting data structures (e.g., queue structure, status register). If the queue structure has overflowed, the VMM determines the queue structure has overflowed by reading the status register and then can read each interrupt-arrived bit to determine the posted data structures that have posted interrupts (e.g., reading one bit per posted data structure instead of reading four double words for each posted data structure). This causes less CPU cycles to be consumed to locate the posted interrupts and less VMM processing time to be used to schedule the VPs, thus increasing overall workload performance and decreasing power consumption (e.g., increasing battery life).

FIG. 1A illustrates a system 100 including physical hardware 110, a VMM 160, and one or more VMs 140, according to certain embodiments. A host system may include the physical hardware 110. Multiple VMs 140A-Z may be managed by the same VMM 160 and may execute on the same physical hardware 110.

The physical hardware 110 may include a processor 112 and main memory 130 that is communicably coupled to the processor 112. In one embodiment, processor 112 and main memory 130 are fabricated on a system-on-a-chip (SoC). The main memory 130 may store system application programs and user application programs and the data associated with these programs. The processor 112 may execute tasks such as system applications and user applications using the main memory 130 to store the instructions of the programs and data associated with the programs.

In some embodiments, the processor 112 includes a logic circuit implemented to support execution of a set of virtualization instructions (e.g., virtual-machine extension (VMX)) to provide support for one or more virtualization environments ported on the physical hardware 110. The VMX may provide processor-level support for one or more VMs 140. In one embodiment, the VMX includes instructions to support a VMM 160 that is a host program that allows one or more execution environments (e.g., VMs 140) to run on the physical hardware 110. VMM 160 may create and run one or more VMs 140. Processor core 114 may execute the VMM 160 (that includes VMM scheduler 162 and one or more scheduler queues 164) and one or more VMs 140 (that each includes one or more VPs 150).

The processor 112 may include one or more processor cores 114, interrupt posting circuit 118, and reporting data structures 119. Reporting data structures 119 may include a queue structure 120 (e.g., an inactive PID reporting queue structure), head pointer 125, tail pointer 126, base address 127, tail address 128, and status register 129. The reporting data structures 119 may be stored in a processor cache (e.g., a cache of processor 112). The processor 112 may include input-output memory management unit (IOMMU) circuitry 116 that includes the interrupt posting circuit 118 and the reporting data structures 119 (e.g., the reporting data structures 119 may be part of the processor cache and the IOMMU circuitry 116). Processor cores 114 are logic circuits within the processor 112 for executing certain tasks (e.g., software applications). The interrupt posting circuit 118 may be a logic circuit within the processor 112 for executing certain tasks. In some embodiments, the interrupt posting circuit 118 is a logic circuit within the processor core 114. In some embodiments, the interrupt posting circuit 118 is implemented by one or more of software running on the processor 112, firmware of the processor 112, or hardware (e.g., circuitry) within the processor 112.

The VMM 160 may allocate a posted data structure 132 (e.g., PID structure) in main memory 130 for each VP 150 of each VM 140. For example, VMM 160 may allocate a posted data structure 132A for VP 150A of VM 140A and may allocate a posted data structure 132B for VP 150B of VM 140B. Each posted data structure 132 may include a posted interrupt request register (PIRR) 134 and an interrupt-arrived bit 136.

The processor 112 (e.g., IOMMU circuitry 116, interrupt posting circuit 118, etc.) may receive an interrupt request directed to (e.g., targeting) a VP 150. The interrupt request may be received from one or more of a device, an input/output (I/O), peripheral, keyboard, mouse, trackball, pointing device, monitor, printer, media card, network interface, information storage device, etc. The interrupt request may be received from a discrete component or an integrated component (e.g., a device integrated with other devices). The interrupt request may be received from a function in a multifunctional I/O, peripheral, or other device. An interrupt request may be generated from within a chipset (e.g., a timer or other device in the chipset may generate an interrupt). The interrupt request may be received through an interface. In some embodiments, the interrupt request may be received as a signal (e.g., a level or edge triggered interrupt signal). In some embodiments, the interrupt request may be received as a message (e.g., a bus message, a point-to-point transaction). In some embodiments, processor 112 may receive signal-based and message-based interrupts (e.g., processor 112 receives signal-based requests through input terminals and message-based requests through write transactions to an address or port corresponding to a register or other storage location assigned to an interrupt controller).

In some embodiments, the processor 112 (e.g., IOMMU circuitry 116, interrupt posting circuit 118, etc.) may inject interrupt requests (e.g., device interrupts) directly into the VMs 140 that are running on the VMM 160 without any software processing by the VMM 160 (e.g., responsive to the VP 150 that the interrupt request is targeting being in an active state). Responsive to the VP 150 that the interrupt request is targeting being in an inactive state, the interrupt posting circuit 118 may post the interrupt request in a posted data structure 132 corresponding to the VP 150.

Figure 1B:
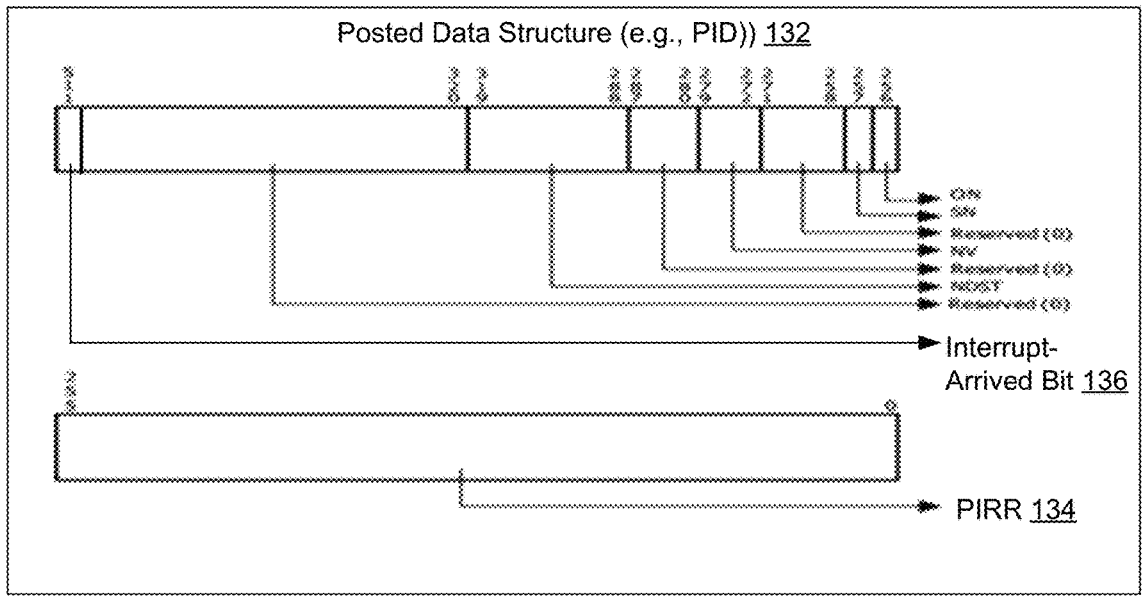
FIG. 1B illustrates a posted data structure that includes an interrupt-arrived bit, according to certain embodiments.

FIG. 1B illustrates the posted data structure 132, in accordance with certain embodiments. The posted data structure 132 may be a posted interrupt descriptor (PID). A PID may be a 64-byte aligned and sized structure in main memory 130 used by interrupt posting circuit 118 to post (record) interrupt requests subject to posting (e.g., targeting a VP 150 that is in an inactive state). The VMM 160 may allocate the PIDs in coherent (write-back) main memory. The PID may include a PIRR 134, an outstanding notification (ON) bit, a suppress notification (SN) bit, a notification vector (NV) bit, and a notification destination (NDST) bit. The PIRR 134 may provide storage for posting (recording) interrupts for a VP 150 (e.g., 1-bit per virtual vector). The PIRR 134 may be 256-bit wide and each bit in the PIRR 134 may represent the vector number of a posted interrupt. Responsive to an interrupt request targeting a VP 150A arriving at the processor 112, the interrupt posting circuit 118 may direct the interrupt to a corresponding bit (e.g., of the PIRR 134A) in the posted data structure 132A corresponding to the VP 150A. The ON bit, if set, indicates a pending notification event is yet to be serviced (e.g., no need to send another). The SN bit, if set, indicates a suppress notification event when posting non-urgent interrupts. For example, the VMM 160 may set the SN bit of a posted data structure 132A corresponding to VP 150A responsive to determining VP 150A is in an inactive state (e.g., not running, parked, not receiving interrupt requests, etc.). NV bit may be a host-vector for a notification event. NDST bit may be an advanced programmable interrupt controller identifier (APIC-ID) of a target CPU for a notification event (e.g., 8-bits in xAPIC mode, 32-bits in x2APIC mode).

Periodically, the VMM 160 is to determine whether an inactive VP 150 is to be scheduled (e.g., VMM 160 tries to schedule VP 150). Conventionally, to determine whether to schedule VPs 150, the VMM 160 reads, for each VP 150, the corresponding PIRR 134 (e.g., under a lock) to identify if a bit is set. If a bit of a PIRR 134 is set, then the VMM 160 positions in the corresponding VP 150 in the ready queue for scheduling. Conventionally, to read a PIRR 134 to determine if a bit is set, the VMM 160 is to scan four double words of the PIRR 134 (256-bits). For a VM 140 with a large number of VPs 150 (e.g., 64-256 VPs 150 in a huge VM or monster VM), the VMM 160 is to scan the PIRR 134 of each of the VPs 150 to identify if any bit is set in each PIRR 134 and queue the corresponding VP 150 for scheduling.

Assuming X CPU cycles is spent to scan one double word under lock mode and assuming N is the number of VPs in a VM, the total CPU cycle spent scanning all PIRR for N VPs is 4*X*N (i.e., four double words per PIRR).

System 100 of FIG. 1A eliminates the four-double reads for each VP 150 and speeds up processing of PIRR 134 in VMM 160. As illustrated in FIGS. 1A-B, each posted data structure 132 includes an interrupt-arrived bit 136. The interrupt-arrived bit 136 may be a new bit in the PID reserved region (e.g., any bits from 320-511 in PID structure, bit 511) to indicate (e.g., to software, to the processor 112, to the processor core 114, to the VMM 160) that a new interrupt vector is set in the PIRR 134. The interrupt processing circuit 118 sets the bit in the PIRR 134 (e.g., records the interrupt request in the posted data structure 132) and also sets the interrupt-arrived bit 136.

The interrupt-arrived bit 136 (e.g., bit 511 in the PID structure) may be set with lock whenever PIRR 134 is updated in the posted data structure 132 (e.g., responsive to recording the interrupt request in the posted data structure 132). Reading the interrupt-arrived bit 136 (e.g., one bit) for each VP 150 is much faster than reading the entire PIRR 134 (256 bits) for each VP 150.

The interrupt posting circuit 118 may receive an interrupt request targeting VP 150A. The interrupt posting circuit 118 may determine the VP 150A is in an inactive state. For example, the interrupt posting circuit 118 may read the SN bit of the posted data structure 132A to determine that the VP 150A is in an inactive state. The interrupt posting circuit 118 may record the interrupt request in posted data structure 132A (e.g., record in PIRR 134 and set the interrupt-arrived bit 136) and may update the queue structure 120 based on the recording of the interrupt request in the posted data structure 132A.

Figure 1C:
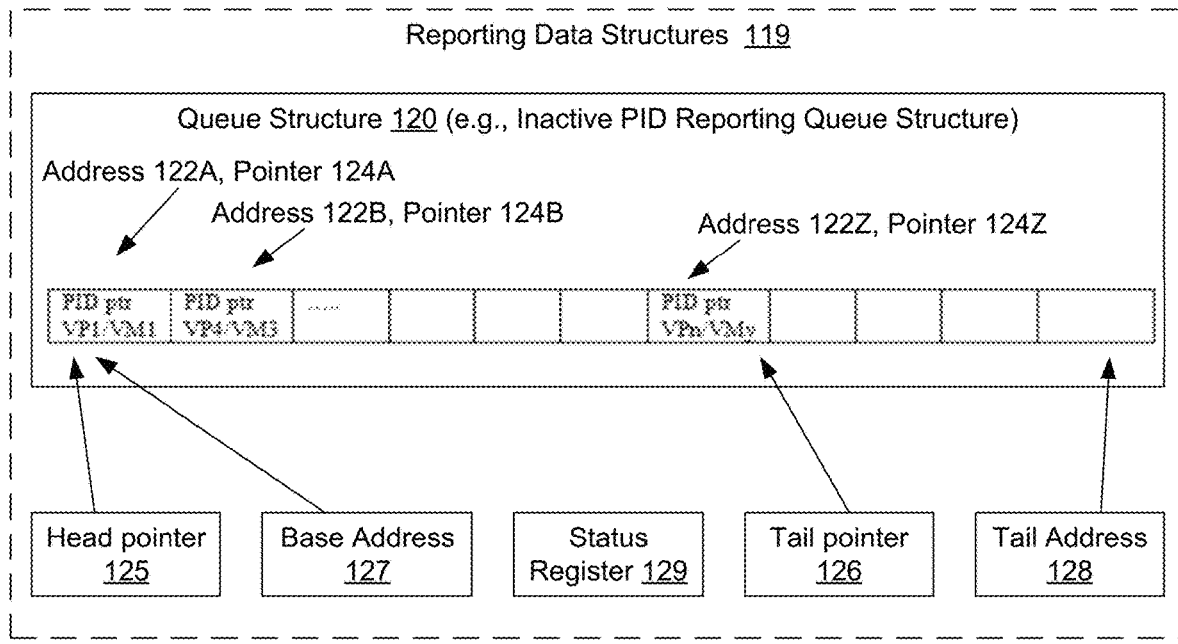
FIG. 1C illustrates reporting data structures that include a queue structure, according to certain embodiments.

FIG. 1C illustrates reporting data structures 119, according to certain embodiments. Reporting data structures 119 includes a queue structure 120 (e.g., inactive PID reporting queue structure), a head pointer 125, a tail pointer 126, a base address 127, a tail address 128, and a status register 129. Queue structure 120 may include one or more addresses 122 and one or more pointers 124. The head pointer 125, tail pointer 126, base address 127, tail address 128, and status register 129 may be used to manage the queue structure 120. The base address 127 may provide physical address of the queue structure 120 programmed by the VMM 160. The tail address 128 may provide the physical address of queue structure 120. The head pointer 125 may provide the offset of the head entry of the queue structure 120. The tail pointer 126 may provide the offset of the tail entry of the queue structure 120. The status register 129 may indicate whether any overflow condition occurred.

Queue structure 120 may queue a list of PID pointers corresponding to interrupt requests targeting VPs 150 having arrived when a corresponding SN bit is set (e.g., the VP 150 is in an inactive state). Queuing a list of PID pointers in the queue structure 120 may allow the VMM 160, during scheduler evaluation windows, to inspect only the posted data structures 132 that are reported in the queue structure 120, reducing the number of posted data structures 132 to inspect to schedule the VPs 150. If the queue structure 120 has overflowed, the VMM 160 is to read interrupt-arrived bit 136 of each posted data structure 132 (e.g., bit 511) to identify the VPs 150 to schedule. The VMM 160 would scan only the interrupt-arrived bit 136 of each posted data structure 132 instead of scanning four double words. Responsive to finding an interrupt-arrived bit 136 that is set, the VMM 160 schedules the corresponding VP 150 for running. Before the VP 150 is to resume in non-root virtualization mode (e.g., responsive to being scheduled for processing the interrupt requests in the posted data structure 132), VMM is to clear the interrupt-arrived bit 136 in the posted data structure 132 so that the next interrupt request arrival is to be noted.

During initialization phase, the VMM 160 may allocate physically continuous memory for the queue structure 120 and may program the base address 127 and the tail address 128 of the queue. The VMM 160 may also initialize the head pointer 125 and the tail pointer 126.

The interrupt posting circuit 118 may update location information stored in reporting data structures 119 (e.g., the queue structure 120, status register 129) responsive to recording an interrupt request in a posted data structure 132. Responsive to receiving an interrupt request, the interrupt posting circuit 118 may add the corresponding PID Ptr to the queue structure 120 and adjust the tail pointer 126. The VMM 160, during scheduler evaluation, may inspect the head pointer 125 and tail pointer 126 and start removing the PID entries at the head pointer 125 (e.g., starting at pointer 124A and ending at pointer 124Z) to add to corresponding scheduler queues 164. If the head pointer 125 and tail pointer 126 either reached a condition where an over flow occurs in adding the PID Ptr, the interrupt posting circuit 118 is to set the status register 129 of the queue structure 120 to indicate the overflow condition. The VMM 160 (e.g., in the VMM scheduler evaluation flow) is to check the status register 129 before removing the PID Ptr from the queue structure 120. If the overflow situation is indicated in the status register 129, then the VMM 160 is to scan each interrupt-arrived bit 136 (e.g., each PID's 511 bit) to determine which VP 150 is to be added to the ready queue (e.g., scheduler queue 164) of the VMM scheduler 162.

Returning to FIG. 1A, responsive to recording the interrupt request in the posted data structure 132, the interrupt posting circuit 118 may update location information (e.g., current value in queue structure 120 or status register 129) stored in the reporting data structures 119 based on the recording of the interrupt request in the posted data structure 132 to generate updated location information (e.g., updating address 122 and/or pointer 124 stored in the queue structure 120, setting status register 129) that identifies a location of the interrupt request. In some embodiments, the interrupt posting circuit 118 updates one or more of an address 122 or a pointer 124 stored in the queue structure 120 based on the recording of the interrupt request (e.g., adds a PID pointer and a physical address of the interrupt). In some embodiments, the interrupt posting circuit 118 determines that the queue structure 120 has reached a maximum capacity (e.g., has overflowed) and sets a status register 129 of the reporting data structures 119.

The VMM 160 may periodically check the reporting data structures 119 to determine whether there are posted requests for one or more of the VPs 150 of the VMs 140 managed by the VMM 160. The VMM may read the status register 129. Responsive to the status register 129 not being set, the VMM 160 may read the addresses 122 and pointers 124 to locate the posted interrupts in the posted data structures 132.

Responsive to the status register 129 being set (e.g., indicating the queue structure 120 has overflowed), the VMM 160 may read the interrupt-arrived bit 136 of each of the posted data structures 132 in the main memory 130. Responsive to the status register 129 being set, the VMM 160 may locate posted interrupts based on the addresses 122 and pointers 124 in the queue in addition to reading the interrupt-arrived bit 136 of each of the posted data structures 132.

The VMM 160 may remove each of the posted interrupts from each of the posted data structures 132 indicated by the queue structure 120 (e.g., status register 129 not being set) or interrupt-arrived bit 136 (e.g., status register 129 being set) and may place the posted interrupts in a scheduler queue 164 corresponding to the posted data structure 132 from which the posted interrupts were removed. For example, the posted interrupts in posted data structure 132A corresponding to VP 150A may be placed by VMM 160 in the scheduler queue 164A corresponding to VP 150A. Responsive to removing the posted interrupts from a posted data structure 132, the VMM 160 unsets the interrupt-arrived bit 136 of the posted data structure 132 (e.g., VMM 160 clears the posted data structure 132 and the corresponding interrupt arrived bit 136).

Responsive to placing posted interrupts in a scheduler queue 164 corresponding to a VP 150, the VMM 160 may cause the VP 150 to change from an inactive state to an active state and may provide the posted interrupts to the VM 140.

Figure 2A:
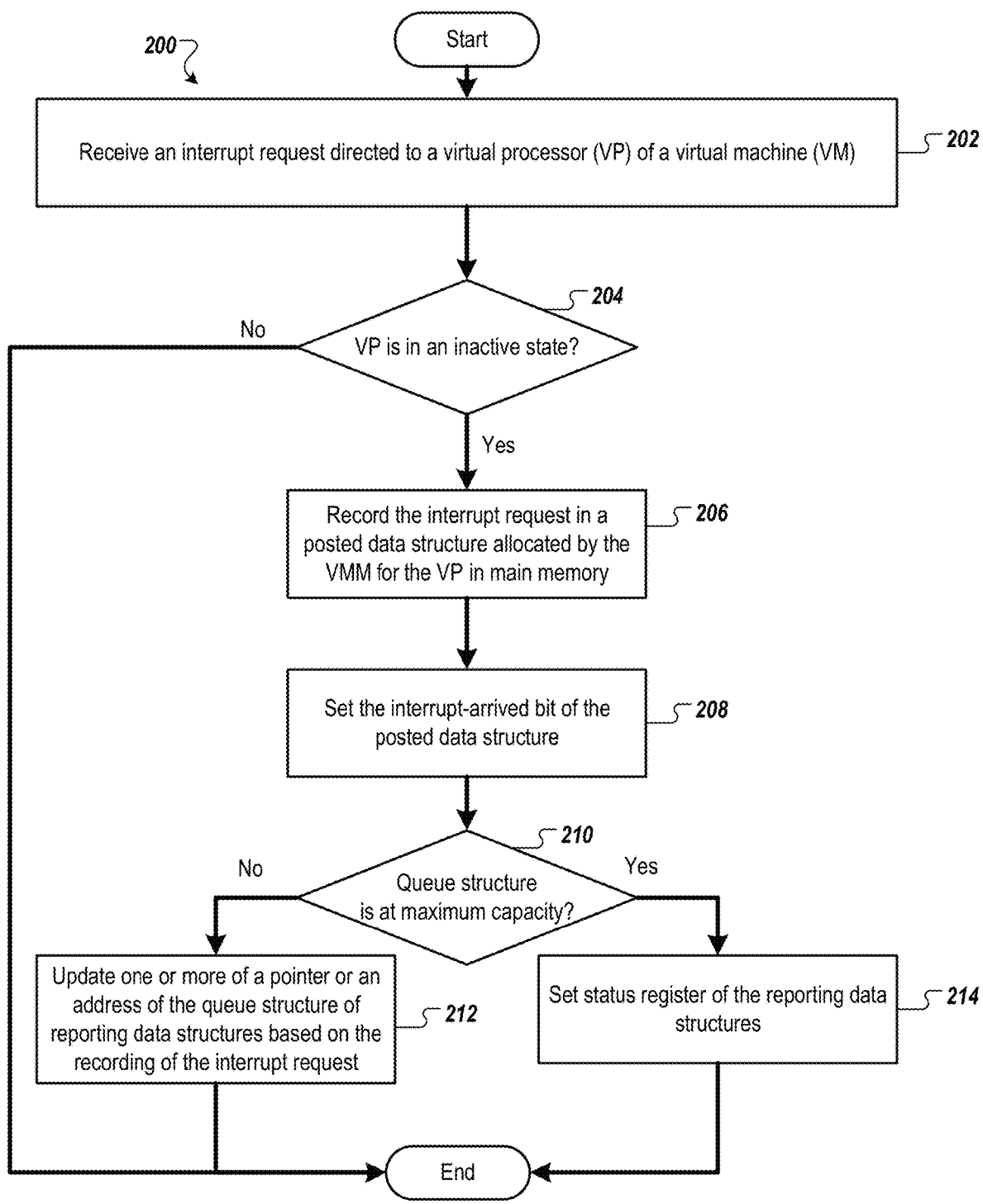
FIGS. 2A-B are flow diagram of methods of posted interrupt processing, according to certain embodiments.
Figure 2B:
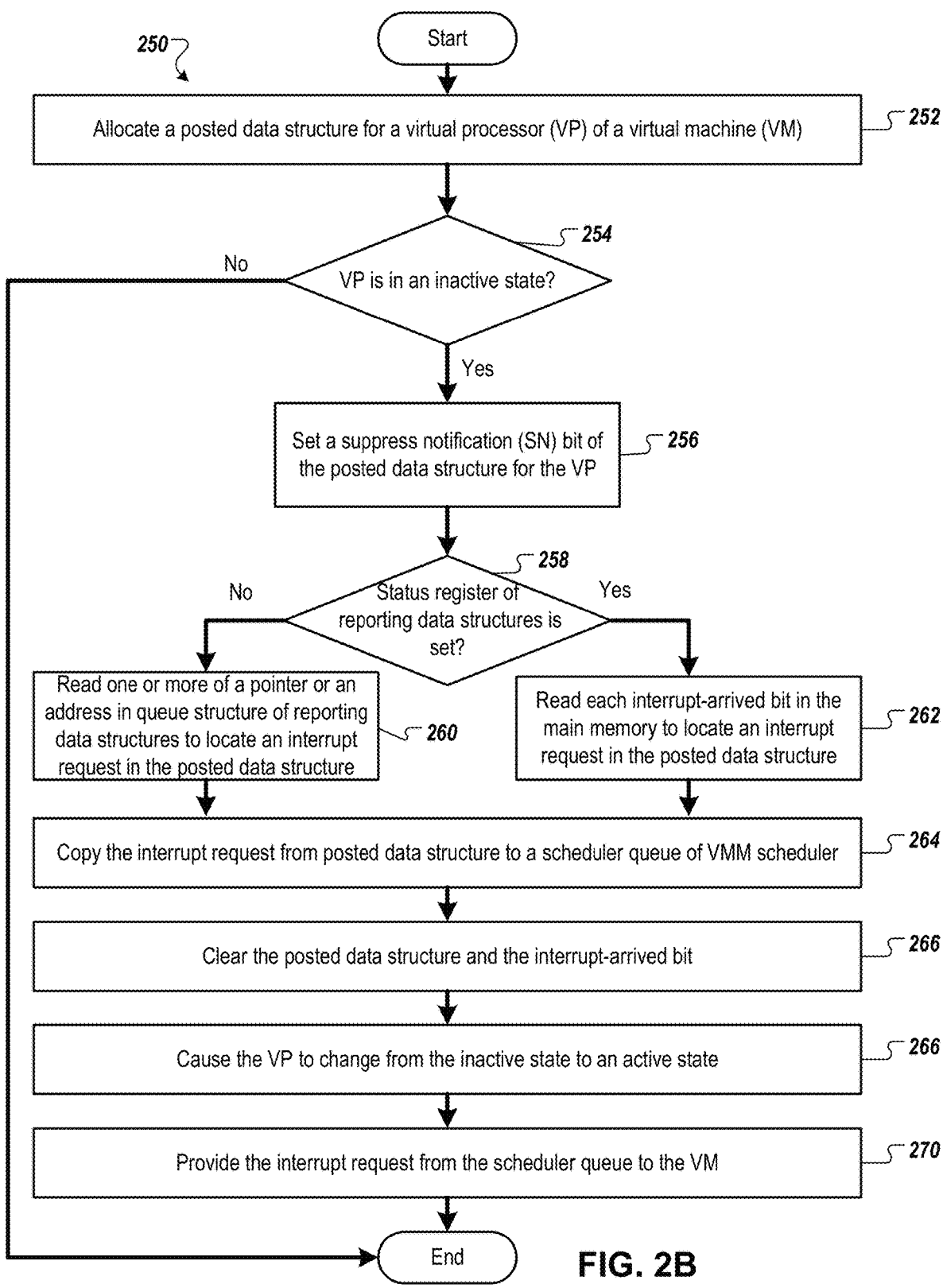

FIGS. 2A-B are flow diagram of methods 200 and 250 of processing posted interrupts, according to certain embodiments. Methods 200 and 250 may be performed by processing logic that is hardware (e.g., circuitry, dedicated logic, programmable logic, microcode, etc.). In one embodiment, methods 200 and 250 may be performed, in part, by processor 112 of FIG. 1. For example, method 200 may be performed by logic circuitry of processor 112 including IOMMU circuitry 116 and interrupt posting circuit 118. Method 250 may be performed by logic circuitry of processor 112 including processor core 114.

For simplicity of explanation, the methods 200 and 250 are depicted and described as acts. However, acts in accordance with this disclosure can occur in various orders and/or concurrently and with other acts not presented and described herein. Furthermore, not all illustrated acts may be performed to implement the methods 200 and 250 in accordance with the disclosed subject matter. In addition, those skilled in the art will understand and appreciate that the methods 200 and 250 could alternatively be represented as interrelated states via a state diagram or events.

Referring to FIG. 2A, at block 202 of method 200, the processing logic (e.g., processor 112, interrupt posting circuit 118) receives an interrupt request directed to VP 150A of VM 140A. The VM 140A is executed by the processor core 114 and managed by VMM 160 that is executed by the processor core 114.

At block 204, processing logic determines whether VP 150A is in an inactive state. In some embodiments, processing logic determines whether VP 150A is in an inactive state by reading the SN bit of the posted data structure 132A corresponding to VP 150A. Responsive to determining VP 150A is not in an inactive state (e.g., SN bit of posted data structure 132A is not set), flow of method 200 ends. In some embodiments, the processing logic may provide the interrupt request to the VP 150A (e.g., without posting the interrupt to the posted data structure 132A) responsive to determining the VP 150A is not in an inactive state. Responsive to determining VP 150 is in an inactive state (e.g., SN bit of posted data structure 132A is set), flow continues to block 206.

At block 206, processing logic records the interrupt request in a posted data structure 132A (e.g., PID structure) allocated by the VMM 160 for the VP 150A in main memory 130.

At block 208, processing logic sets the interrupt-arrived bit 136A of the posted data structure 132A.

Responsive to recording the interrupt request in the posted data structure 132A, the processing logic may update location information stored in the reporting data structures 119 (e.g., see blocks 210-214) based on the recording of the interrupt request in the posted data structure 132A to generate updated location information that identifies a location of the interrupt request.

At block 210, processing logic determines whether the queue structure 120 (e.g., inactive PID reporting queue structure) is at maximum capacity. Responsive to determining the queue structure 120 is not at maximum capacity, flow continues to block 212. Responsive to determining the queue structure 120 is at maximum capacity, flow continues to block 214.

At block 212, processing logic updates one or more of a pointer 124 or an address 122 stored in the queue structure 120 based on the recording of the interrupt request in the posted data structure 132A. The one or more of the pointer or the address may identify the location of the interrupt request. The VMM 160 may locate the interrupt request by reading the one or more of a pointer 124 or an address 122 of the queue structure 120 (e.g., without reading the PIRR 134 of each posted data structure 132 in the main memory 130).

At block 214, processing logic sets a status register 129 of the queue structure 120 to indicate that each interrupt-arrived bit of the main memory is to be read by the VMM to locate the interrupt request. The VMM 160 may locate the interrupt request by reading the status register 129 and then reading each interrupt-arrived bit 136 in the main memory 130 (e.g., without reading the PIRR 134 of each posted data structure 132 in the main memory 130).

In some embodiments, responsive to locating the interrupt request in the posted data structure 132A (e.g., via reading the queue structure 120), the VMM 160 is to copy the interrupt request from the posted data structure 132A (e.g., to the scheduler queue 164A of the VMM scheduler 162) to schedule the VP 150A based on the interrupt request. Responsive to copying the interrupt request (and any other interrupt requests posted therein) from the posted data structure 132A, the VMM 160 is to clear the posted data structure 132A and is to clear the interrupt-arrived bit 136A.

Although method 200 refers to an interrupt request targeting VP 150A and being recorded in posted data structure 132A, it is understood that method 200 applies to multiple interrupt requests. In some embodiments, multiple interrupt requests target the same VP 150A. In some embodiments, a first set of interrupt requests target a VP 150A of VM 140A and a second set of interrupt requests target a VP 150B of VM 140B. In some embodiments, a first set of interrupt requests target a first VP 150 of VM 140A and a second set of interrupt requests target a second VP 150 of VM 140A. The processing logic may receive the interrupt requests, record the interrupt requests in corresponding posted data structures 132, and update location information stored in the reporting data structures 119 based on the recording of the interrupt requests.

Referring to FIG. 2B, method 250 may cause VMM 160 to process posted interrupts. In some embodiments, processor 112 is the processing logic that performs method 250. In some embodiments, processor core 114 is the processing logic that performs method 250. In some embodiments, the processor core 114 executes VMM 160 to perform method 250.

At block 252, the processing logic (e.g., processor 112, processor core 114) allocates a posted data structure 132A (PID structure) for VP 150A of a VM 140A. The processing logic may allocate the posted data structure 132A in main memory 130 that is coupled to the processor 112 (e.g., main memory 130 and processor 112 are both part of physical hardware 110). VM 140A may be executed by processor core 114 and managed by VMM 160. In some embodiments, the processing logic allocates (e.g., generates) an interrupt-arrived bit 136A in the posted data structure 132A. The processing logic may allocate a PIRR 134A in the posted data structure 132A.

At block 254, the processing logic determines whether the VP 150A is in an inactive state. Responsive to determining VP 150A is not in an inactive state (e.g., is in an active state), flow of method 250 ends. In some embodiments, the interrupt requests targeting VP 150A may be provided to the VP 150A (e.g., without posting in posted data structure 132A) responsive to determining VP 150A is not in an inactive state. Responsive to determining VP 150A is in an inactive state, flow continues to block 256.

At block 256, processing logic sets an SN bit of the posted data structure 132A for the VP 150A. Upon receiving an interrupt request targeting posted data structure 132A, interrupt posting circuit 118 is to read the SN bit of the posted data structure 132A and then record the interrupt request in the posted data structure 132A, set the interrupt-arrived bit 136A, and update the queue structure 120 based on the recording of the interrupt request in the posted data structure 132A.

Periodically, the processing logic is to read the reporting data structures 119 (e.g., blocks 258-262) to locate one or more interrupt requests recorded in the posted data structures 132 of main memory 130.

At block 258, processing logic determines whether status register 129 of reporting data structures 119 is set (e.g., determine whether the overflow is set). Responsive to determining the status register 129 is not set (e.g., the amount of interrupt requests recorded to the posted data structures 132 does not exceed the maximum capacity of the queue structure 120), flow continues to block 260. Responsive to determining the status register 129 is set, flow continues to block 262 (e.g., the amount of interrupt requests recorded to the posted data structures 132 exceeds the maximum capacity of the queue structure 120).

At block 260, processing logic reads one or more of a pointer 124 or an address 122 in the queue structure 120 to locate an interrupt request in the posted data structure 132A. Reading the pointers 124 or addresses 122 in the queue structure 120 is much faster than reading every PIRR 134 in the main memory 130 to locate interrupt requests. In some embodiments, processing logic reads the head pointer 125 and the tail pointer 126 and processes each entry by removing the PID Ptr and adding to the scheduler queue 164 corresponding to the posted data structure 132 (e.g., corresponding to the VP 150).

At block 262, processing logic reads each interrupt-arrived bit 136 in the main memory 130 to locate an interrupt request in the posted data structure 132 (e.g., for each PID, scan the PID and inspect bit 511 to identify if any interrupt request is pending in the PIRR 134 and if bit 511 is set, add the virtual process to the scheduler queue 164). Reading each interrupt-arrived bit 136 in main memory 130 is much faster than reading every PIRR 134 in the main memory 130 to locate interrupt requests.

At block 264, processing logic copies the interrupt request from the posted data structure 132A to a scheduler queue 164A of the VMM scheduler 162 (e.g., to schedule the VP 150A based on the interrupt request). Processing logic copies all interrupts from each posted data structure 132 indicated by the queue structure 120 or interrupt-arrived bit 136 as having a posted interrupt. If there are less PID entries in the queue structure 120 than the maximum capacity of the queue structure 120, the VMM 160 can quickly lookup the VP 150 and add the interrupt requests to the scheduler queue 164 corresponding to the VP 150. If there is an overflow, the VMM 160 reads all of the PID and inspect the interrupt-arrived bit 136 (e.g., bit 511) which is faster than inspecting the four double word of the PIRR 134 of each of the posted data structures 132. Without an interrupt-arrived bit 136 and queue structure 120, scanning the PIRR 134 for various VP configurations may be as follows:

| Virtual Processor | Number of double words to scan | CPU cycles with lock and scan | Total Cycles spent on scanning |
| --- | --- | --- | --- |
| 32 | 4 | 10 | 1,280 |
| 64 | 4 | 10 | 2,560 |
| 128 | 4 | 10 | 5,120 |
| 192 | 4 | 10 | 7,680 |
| 256 | 4 | 10 | 10,240 |

Using the physical hardware 110 disclosed herein (e.g., interrupt-arrived bits 136, reporting data structures 119, etc.), the cycles used for scanning PIRR 134 for various VP configurations may be as follows:

| Virtual Processor | Number of double words to scan | CPU cycles with lock and scan | Total Cycles spent on scanning |
| --- | --- | --- | --- |
| 32 | 1 | 10 | 320 |
| 64 | 1 | 10 | 640 |
| 128 | 1 | 10 | 1,280 |
| 192 | 1 | 10 | 1,920 |
| 256 | 1 | 10 | 2,560 |

In some embodiments, adding the interrupt arrival bit 136 in the posted data structures 132, reduces the CPU cycles by ten times the amount. Reducing the VMM CPU cycles to process interrupt requests on the platform improves performance (e.g., on client workloads) and battery life (e.g., on active workloads).

At block 266, processing logic clears the posted data structure 132A and the interrupt-arrived bit 136A of the posted data structure 132A.

At block 268, processing logic causes the VP 150A to change from the inactive state to an active state (e.g., schedules the VP 150A).

At block 270, processing logic provides the interrupt request to the VM 140A (e.g., to the VP 150A).

Although method 250 refers to an interrupt request targeting VP 150A and being recorded in posted data structure 132A, it is understood that method 250 applies to multiple interrupt requests. In some embodiments, multiple interrupt requests target the same VP 150A. In some embodiments, a first set of interrupt requests target a VP 150A of VM 140A and a second set of interrupt requests target a VP 150B of VM 140B. In some embodiments, a first set of interrupt requests target a first VP 150 of VM 140A and a second set of interrupt requests target a second VP 150 of VM 140A. The processing logic may read the reporting data structures 119 and locate interrupts located in different posted data structures 132 in main memory 130.

Figure 3:
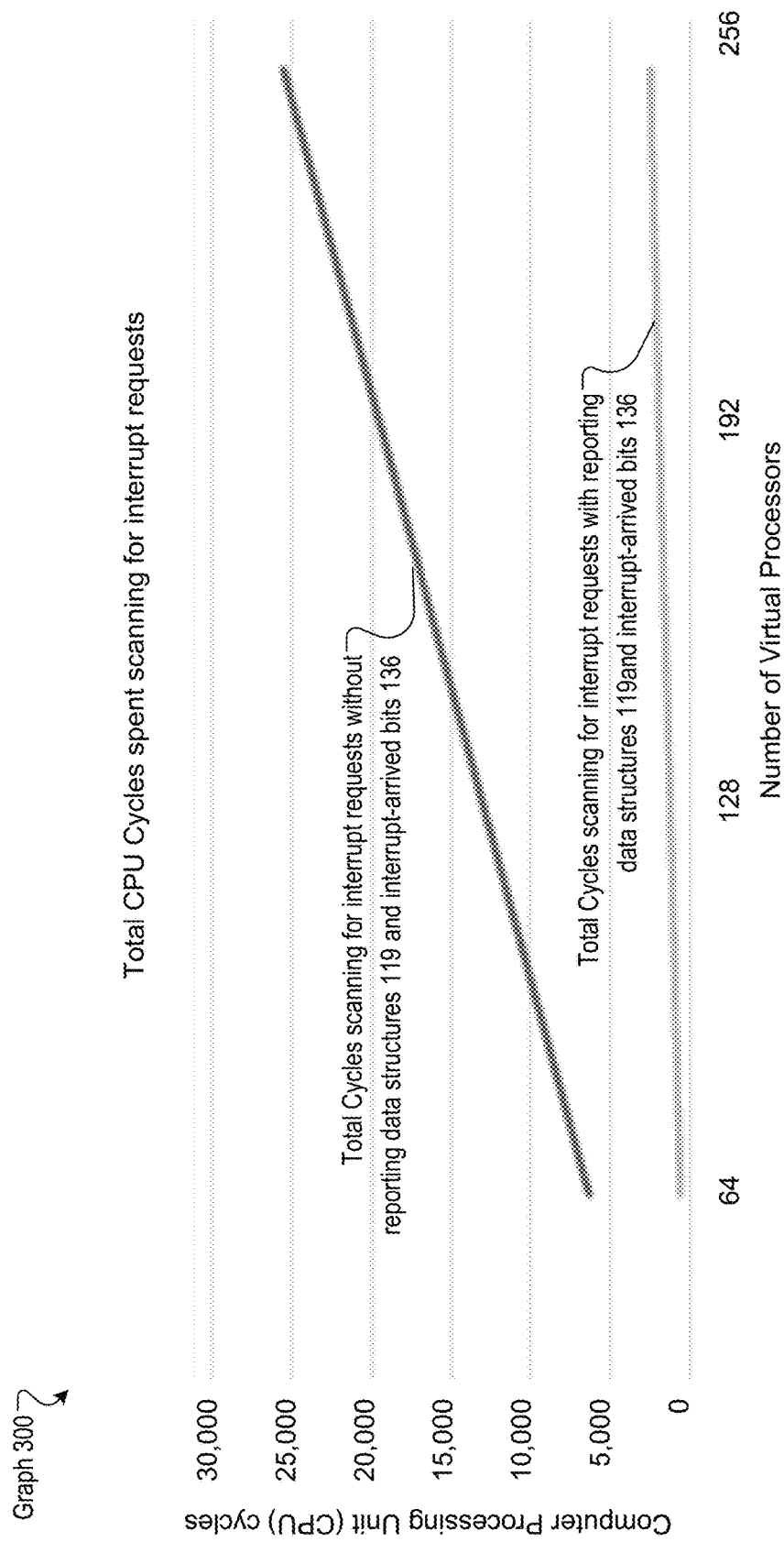
FIG. 3 is a graph illustrating computer processing unit (CPU) cycles used scanning for interrupt requests, according to certain embodiments.

FIG. 3 is a graph 300 illustrating CPU cycles used scanning for interrupt requests, according to certain embodiments. The y-axis is CPU cycles and the x-axis is amount of VPs 150 (e.g., 64 VPs, 128 VPs, 192 VPs, 256 VPs). Physical hardware that does not have reporting data structures 119 and interrupt-arrived bits 136 has higher CPU cycles than physical hardware 110 that has reporting data structures 119 and interrupt-arrived bits 136. The difference between CPU cycles for physical hardware without reporting data structures 119 and interrupt-arrived bits 136 and physical hardware with reporting data structures 119 and interrupt-arrived bits 136 increases as the number of VPs increases. Due to the lower CPU cycles, physical hardware 110 with reporting data structures 119 and interrupt-arrived bits 136 has lower processing overhead and lower power consumption.

Figure 4A:
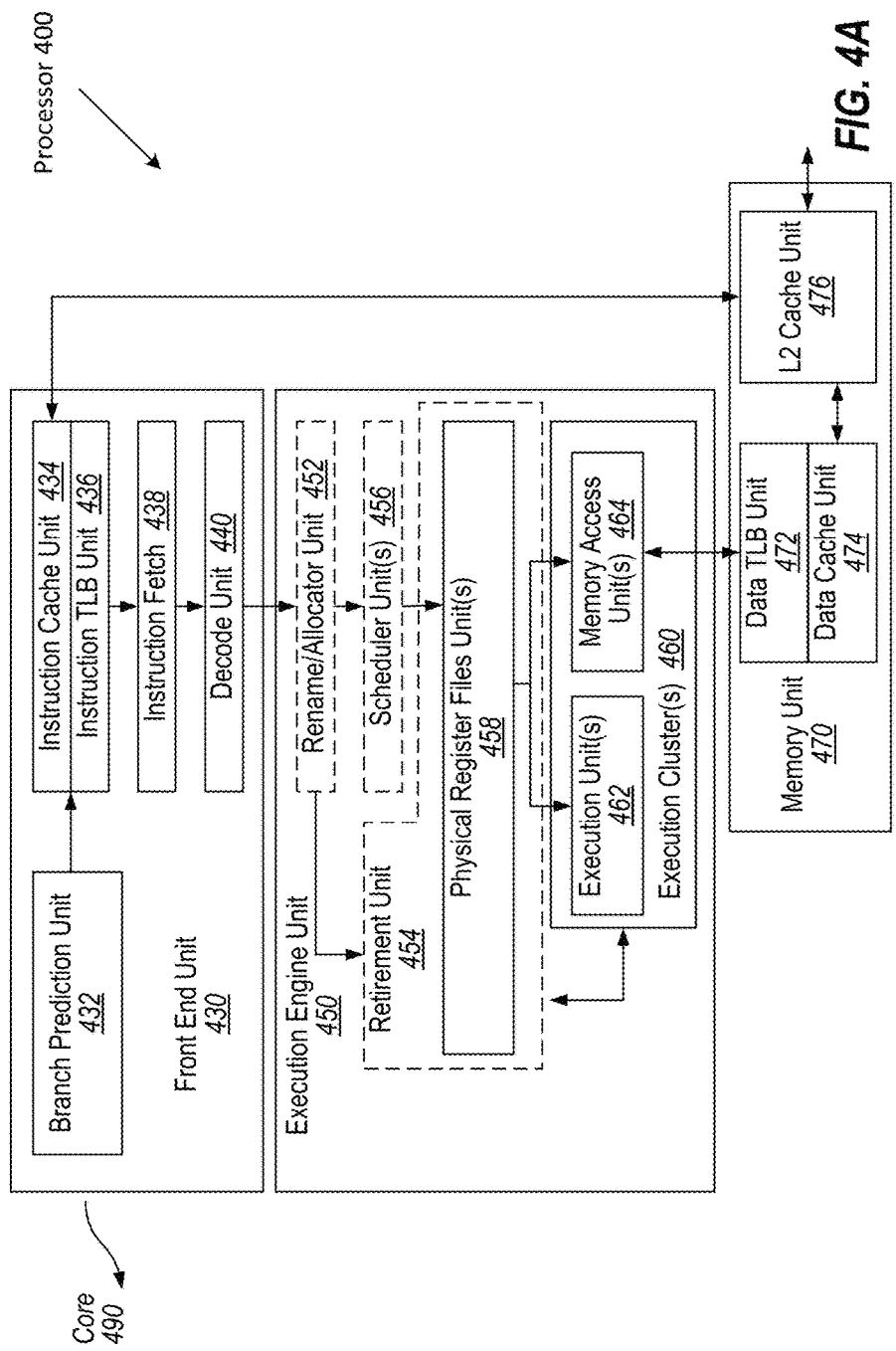
FIG. 4A is a block diagram illustrating a micro-architecture for a processor that performs posted interrupt processing, according to one embodiment.

FIG. 4A is a block diagram illustrating a micro-architecture for a processor 400 that processes posted interrupts in a VMM 160, according to one embodiment. Specifically, processor 400 depicts an in-order architecture core and a register renaming logic, out-of-order issue/execution logic to be included in a processor according to at least one embodiment of the disclosure. The embodiments of the interrupt posting circuit 118 that set interrupt-arrived bits 136 and update location information stored in the reporting data structures 119 can be implemented in processor 400. In some embodiments, processor 400 is the processor 112 of FIG. 1.

Processor 400 includes a front end unit 430 coupled to an execution engine unit 450, and both are coupled to a memory unit 470. The processor 400 may include a core 490 that is a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In another embodiment, the core 490 may have five stages.

The front end unit 430 includes a branch prediction unit 432 coupled to an instruction cache unit 434, which is coupled to an instruction translation lookaside buffer (TLB) unit 436, which is coupled to an instruction fetch unit 438, which is coupled to a decode unit 440. The decode unit 440 (also known as a decoder) may decode instructions, and generate as an output one or more micro-operations, microcode entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware embodiments, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include TLB unit 472 coupled to a data cache unit (DCU) 474 coupled to a level 2 (L2)

cache unit 476. In some embodiments DCU 474 may also be known as a first level data cache (L1 cache). The DCU 474 may handle multiple outstanding cache misses and continue to service incoming stores and loads. It also supports maintaining cache coherency. The TLB unit 472 may be used to improve virtual address translation speed by mapping virtual and physical address spaces. In one exemplary embodiment, the memory access units 464 may include a load unit, a store address unit, and a store data unit, each of which is coupled to the TLB unit 472 in the memory unit 470. The L2 cache unit 476 may be coupled to one or more other levels of cache and eventually to a main memory.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4B:
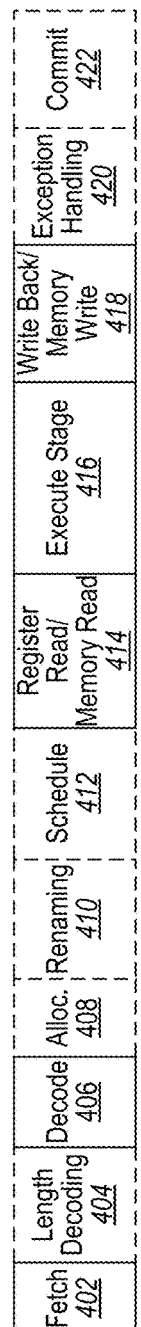
FIG. 4B is a block diagram illustrating an in-order pipeline and a register renaming stage, out-of-order issue/execution pipeline according to an embodiment of the disclosure.

FIG. 4B is a block diagram illustrating an in-order pipeline and a register renaming stage, out-of-order issue/execution pipeline implemented by processor 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor 400 as a pipeline includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 420, and a commit stage 422. In some embodiments, the ordering of stages 402-422 may be different than illustrated and are not limited to the specific ordering shown in FIG. 7B.

Figure 5:
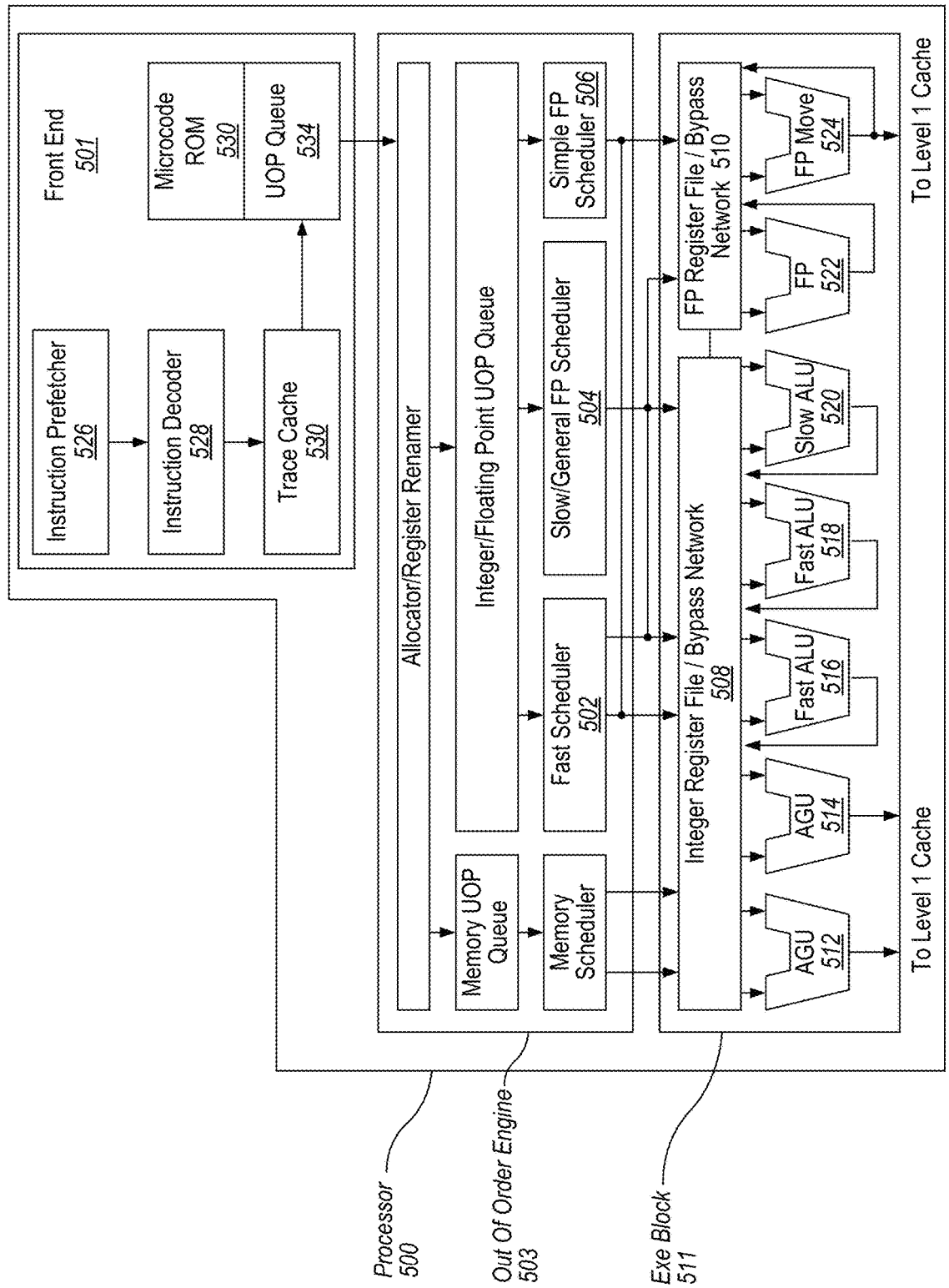
FIG. 5 illustrates a block diagram of the micro-architecture for a processor that performs posted interrupt processing, according to one embodiment.

FIG. 5 illustrates a block diagram of the micro-architecture for a processor 500 that processes posted interrupts in the VMM 160, according to one embodiment. The embodiments of the interrupt posting circuit 118 that set interrupt-arrived bits 136 and update location information stored in the reporting data structures 119 can be implemented in processor 500. In some embodiments, processor 500 is the processor 112 of FIG. 1.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is included of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX™ registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
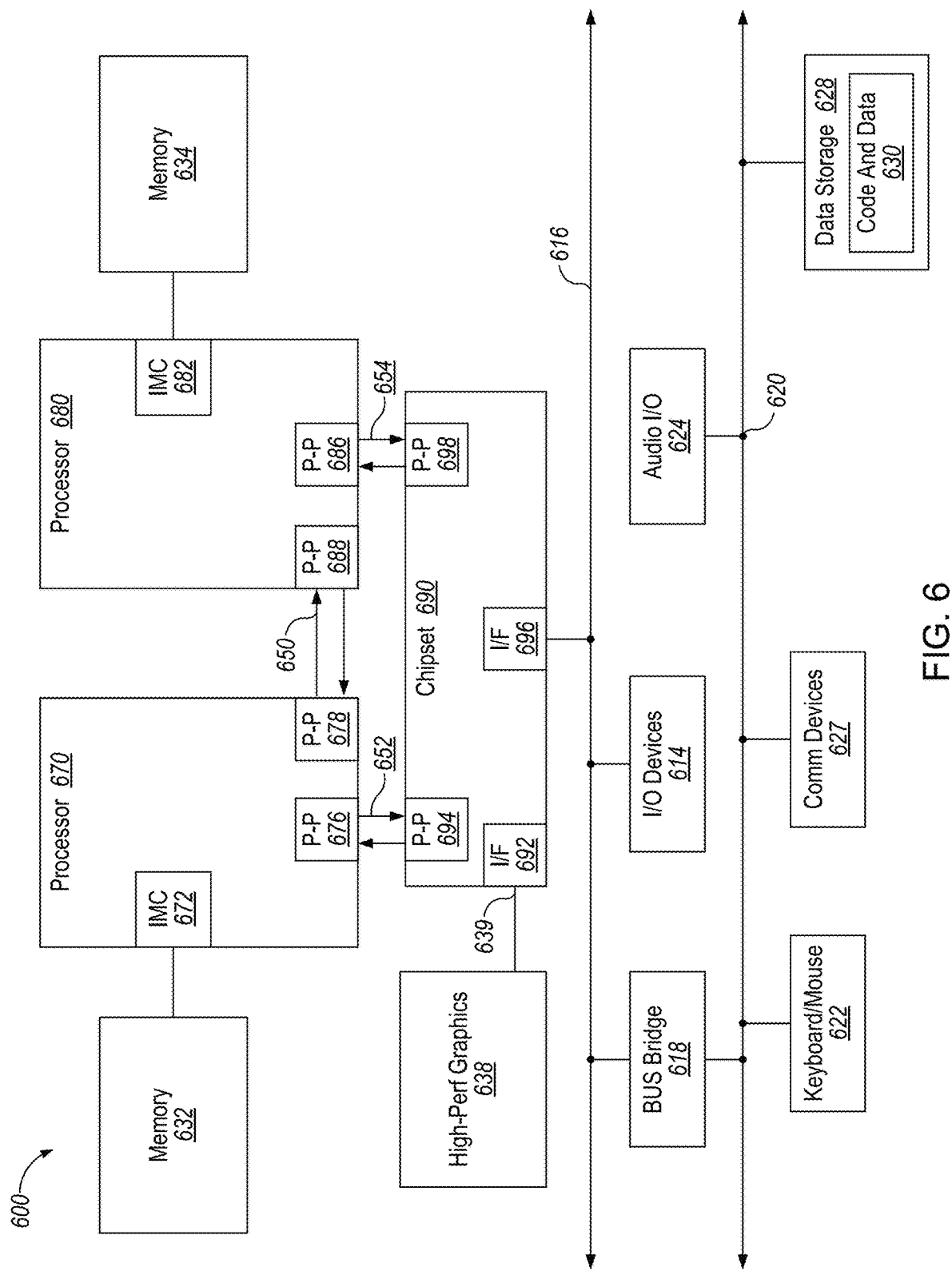
FIG. 6 is a block diagram of a computer system according to one embodiment.

Embodiments may be implemented in many different system types. Referring now to FIG. 6, shown is a block diagram of a multiprocessor system 600 in accordance with an embodiment. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. The embodiments of the interrupt posting circuit 118 that set interrupt-arrived bits 136 and update location information stored in the reporting data structures 119 can be implemented in processor 670, processor 680, or both. In some embodiments, at least one of processor 670 or processor 680 is the processor 112 of FIG. 1.

While shown with two processors 670, 680, it is to be understood that the scope of the present disclosure is not so limited. In other embodiments, one or more additional processors may be present in a given processor.

Processors 670 and 680 are shown including integrated I/O control logic ("CL") 672 and 682, respectively. Processor 670 also includes as part of its bus controller units point-to-point (P-P) interfaces 676 and 688; similarly, second processor 680 includes P-P interfaces 686 and 688. Processors 670, 680 may exchange information via a point-to-point (P-P) interface 650 using P-P interface circuits 678, 688. As shown in FIG. 6, CL 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
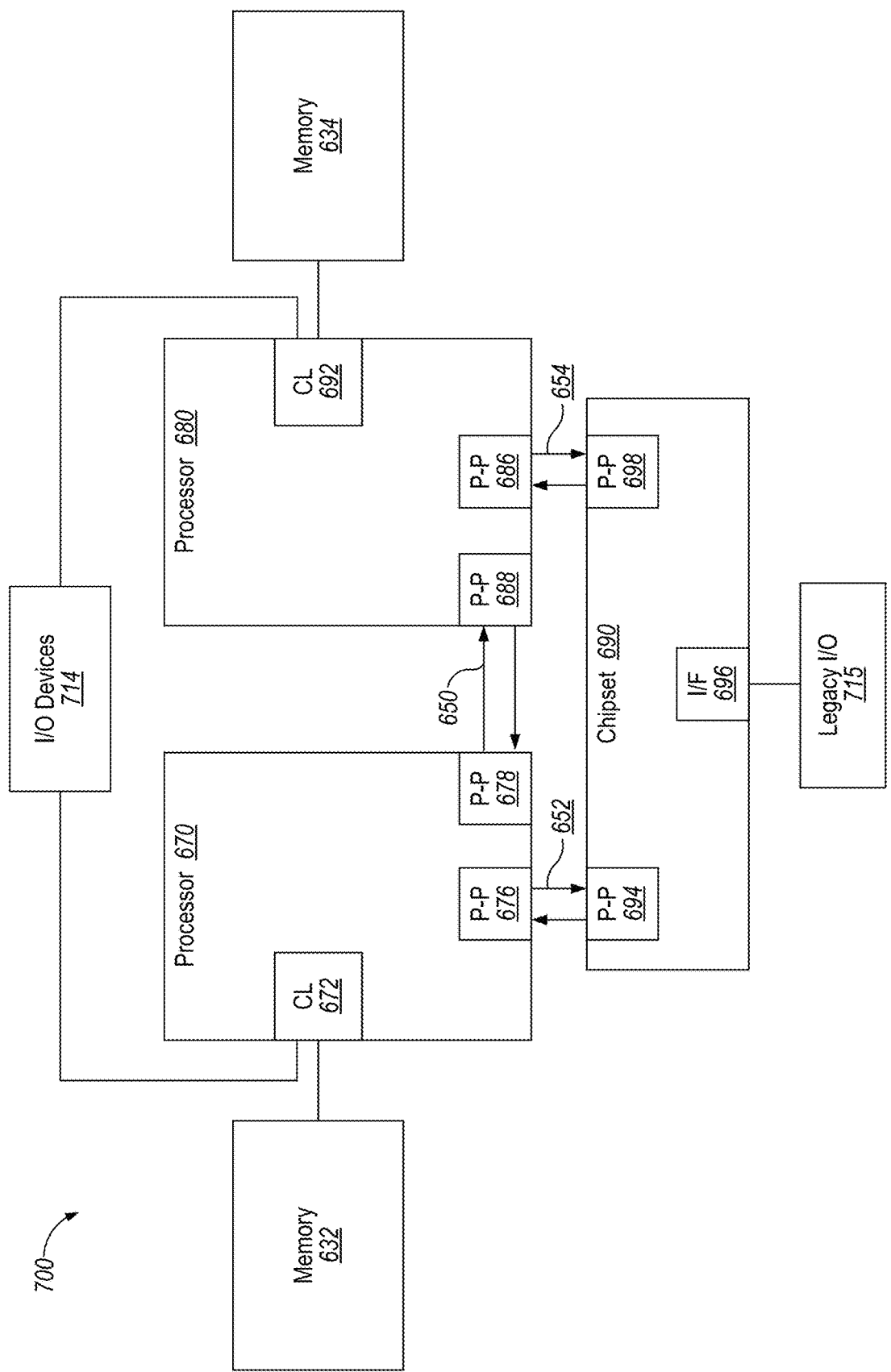
FIG. 7 is a block diagram of a computer system according to another embodiment.

Referring now to FIG. 7, shown is a block diagram of a third system 700 in accordance with an embodiment of the present disclosure. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processors 670, 680 may include integrated memory and I/O control logic ("CL") 672 and 682, respectively. For at least one embodiment, the CL 672, 682 may include integrated memory controller units such as described herein. In addition, CL 672, 682 may also include I/O control logic. FIG. 7 illustrates that the memories 632, 634 are coupled to the CL 672, 682, and that I/O devices 714 are also coupled to the control logic 672, 682. Legacy I/O devices 715 are coupled to the chipset 690. The embodiments of the interrupt posting circuit 118 that set interrupt-arrived bits 136 and update location information stored in the reporting data structures 119 can be implemented in processor 670, processor 680, or both.

Figure 8:
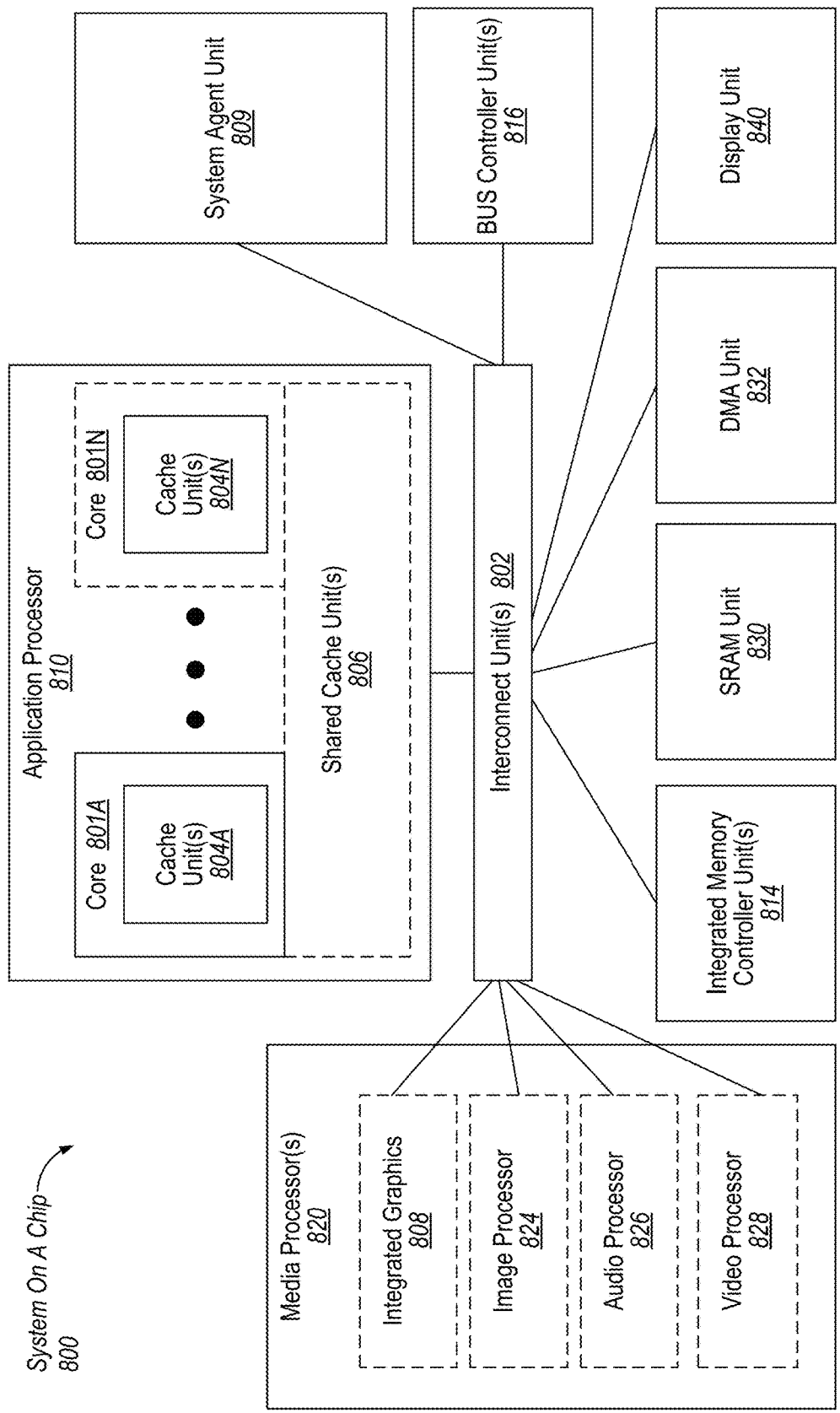
FIG. 8 is a block diagram of a system-on-a-chip according to one embodiment.

FIG. 8 is an exemplary system on a chip (SoC) 800 that may include one or more of the cores 801 (e.g., processor core 114). Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a SoC 800 in accordance with an embodiment of the present disclosure. Also, dashed lined boxes are features on more advanced SoCs. In FIG. 8, an interconnect unit(s) 802 is coupled to: an application processor 810 which includes a set of one or more cores 801A-N and shared cache unit(s) 806; a system agent unit 809; a bus controller unit(s) 816; an integrated memory controller unit(s) 814; a set or one or more media processors 820 which may include integrated graphics logic 808, an image processor 824 for providing still and/or video camera functionality, an audio processor 826 for providing hardware audio acceleration, and a video processor 828 for providing video encode/decode acceleration; a static random access memory (SRAM) unit 830; a direct memory access (DMA) unit 832; and a display unit 840 for coupling to one or more external displays. The embodiments of the interrupt posting circuit 118 that set interrupt-arrived bits 136 and update location information stored in the reporting data structures 119 can be implemented in SoC 800. In one embodiment, processor 112 and main memory 130 of FIG. 1 are fabricated on SoC 800. The embodiments of the interrupt posting circuit 118 that set interrupt-arrived bits 136 and update location information stored in the reporting data structures 119 may be located in the application processor 810.

Figure 9:
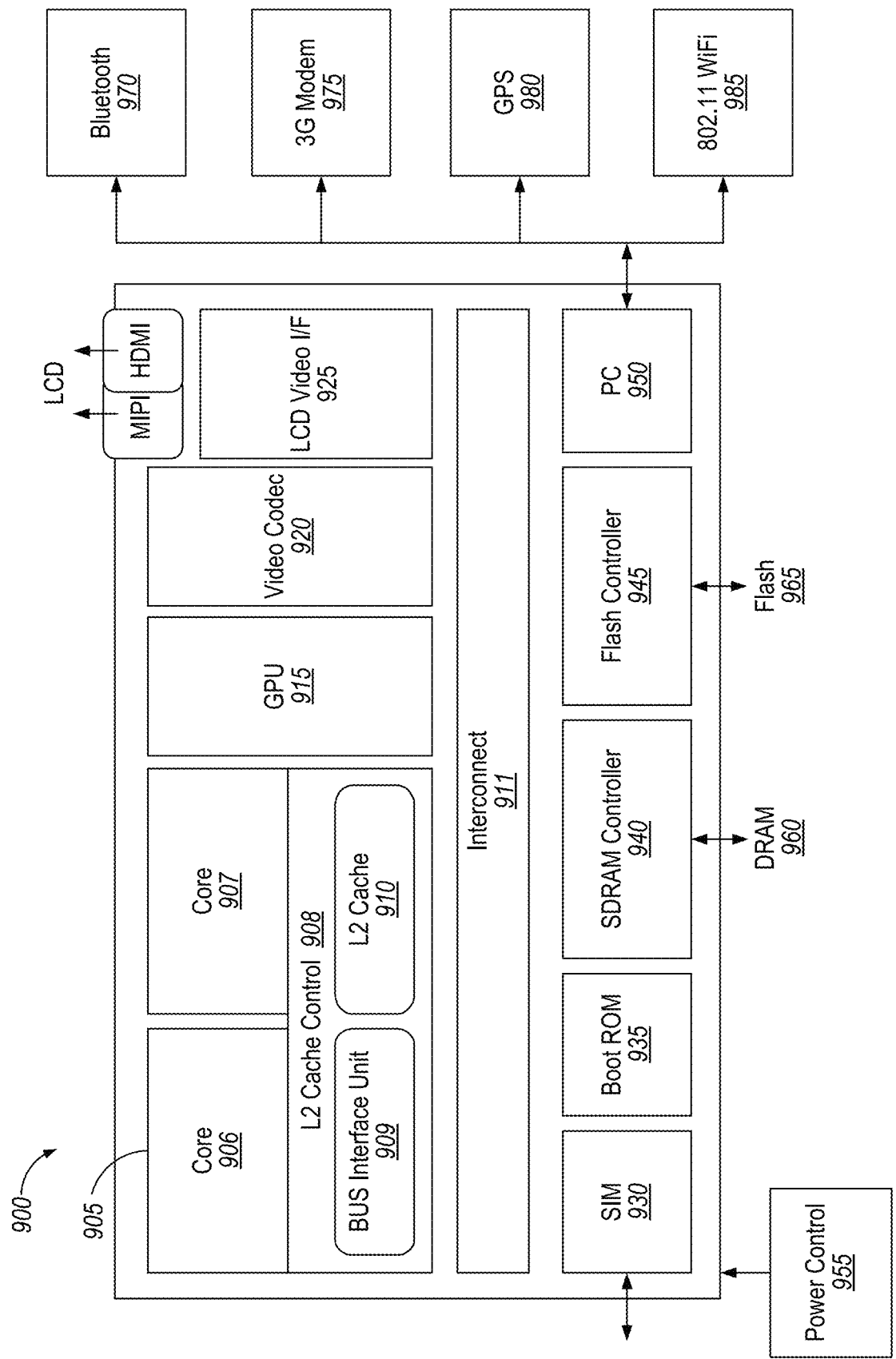
FIG. 9 illustrates another embodiment of a block diagram for a computing system.

Turning next to FIG. 9, an embodiment of a system on-chip (SoC) design in accordance with embodiments of the disclosure is depicted. As an illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the interrupt posting circuit 118 that set interrupt-arrived bits 136 and update location information stored in the reporting data structures 119 can be implemented in SoC 900. In one embodiment, processor 112 and main memory 130 of FIG. 1 are fabricated on SoC 900.

Here, SoC 900 includes 2 cores—906 and 907. Similar to the discussion above, cores 906 and 907 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnects discussed above, which can implement one or more aspects of the described disclosure.

Interconnect 911 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the embodiments described herein.

In addition, the system illustrates peripherals for communication, such as a Bluetooth module 970, 3G modem 975, GPS 980, and Wi-Fi 985. Note as stated above, a UE includes a radio for communication. As a result, these peripheral communication modules may not all be included. However, in a UE some form of a radio for external communication should be included.

Figure 10:
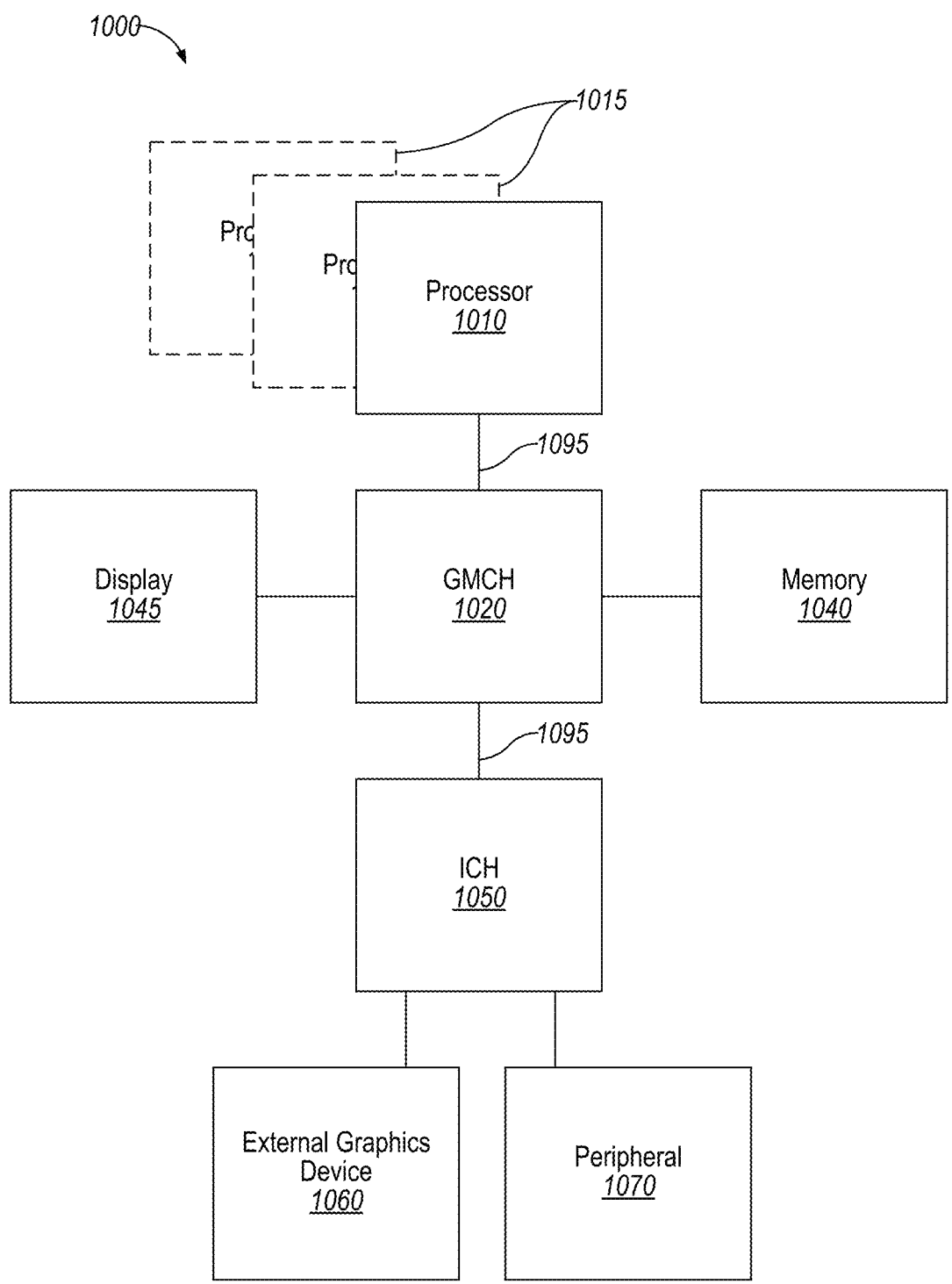
FIG. 10 illustrates a system in which an embodiment of the disclosure may operate.

Referring now to FIG. 10, shown is a block diagram of a system 1000 in which one embodiment of the disclosure may operate. The system 1000 may include one or more processors 1010, 1015, which are coupled to graphics memory controller hub (GMCH) 1020. The optional nature of additional processors 1015 is denoted in FIG. 10 with broken lines. In one embodiment, processors 1010, 1015 implement hybrid cores according to embodiments of the disclosure.

Each processor 1010, 1015 may be some version of the circuit, integrated circuit, processor, and/or silicon integrated circuit as described above. However, it should be noted that it is unlikely that integrated graphics logic and integrated memory control units would exist in the processors 1010, 1015. FIG. 10 illustrates that the GMCH 1020 may be coupled to a memory 1040 that may be, for example, a dynamic random access memory (DRAM). The DRAM may, for at least one embodiment, be associated with a non-volatile cache. In various embodiments, one or more of processors 1010 and 1015 can set interrupt-arrived bits 136 and update location information stored in the reporting data structures 119 as described herein. Additionally, any one of processors 1010 and 1015, in various embodiments, is the same as any one of processor 112.

The GMCH 1020 may be a chipset, or a portion of a chipset. The GMCH 1020 may communicate with the processor(s) 1010, 1015 and control interaction between the processor(s) 1010, 1015 and memory 1040. The GMCH 1020 may also act as an accelerated bus interface between the processor(s) 1010, 1015 and other elements of the system 1000. For at least one embodiment, the GMCH 1020 communicates with the processor(s) 1010, 1015 via a multi-drop bus, such as a frontside bus (FSB) 1095.

Furthermore, GMCH 1020 is coupled to a display 1045 (such as a flat panel or touchscreen display). GMCH 1020 may include an integrated graphics accelerator. GMCH 1020 is further coupled to an input/output (I/O) controller hub (ICH) 1050, which may be used to couple various peripheral devices to system 1000. Shown for example in the embodiment of FIG. 10 is an external graphics device 1060, which may be a discrete graphics device, coupled to ICH 1050, along with another peripheral device 1070.

Alternatively, additional or different processors may also be present in the system 1000. For example, additional processor(s) 1015 may include additional processors(s) that are the same as processor 1010, additional processor(s) that are heterogeneous or asymmetric to processor 1010, accelerators (such as, e.g., graphics accelerators or digital signal processing (DSP) units), field programmable gate arrays, or any other processor. There can be a variety of differences between the processor(s) 1010, 1015 in terms of a spectrum of metrics of merit including architectural, micro-architectural, thermal, power consumption characteristics, and the like. These differences may effectively manifest themselves as asymmetry and heterogeneity amongst the processors 1010, 1015. For at least one embodiment, the various processors 1010, 1015 may reside in the same die package.

Figure 11:
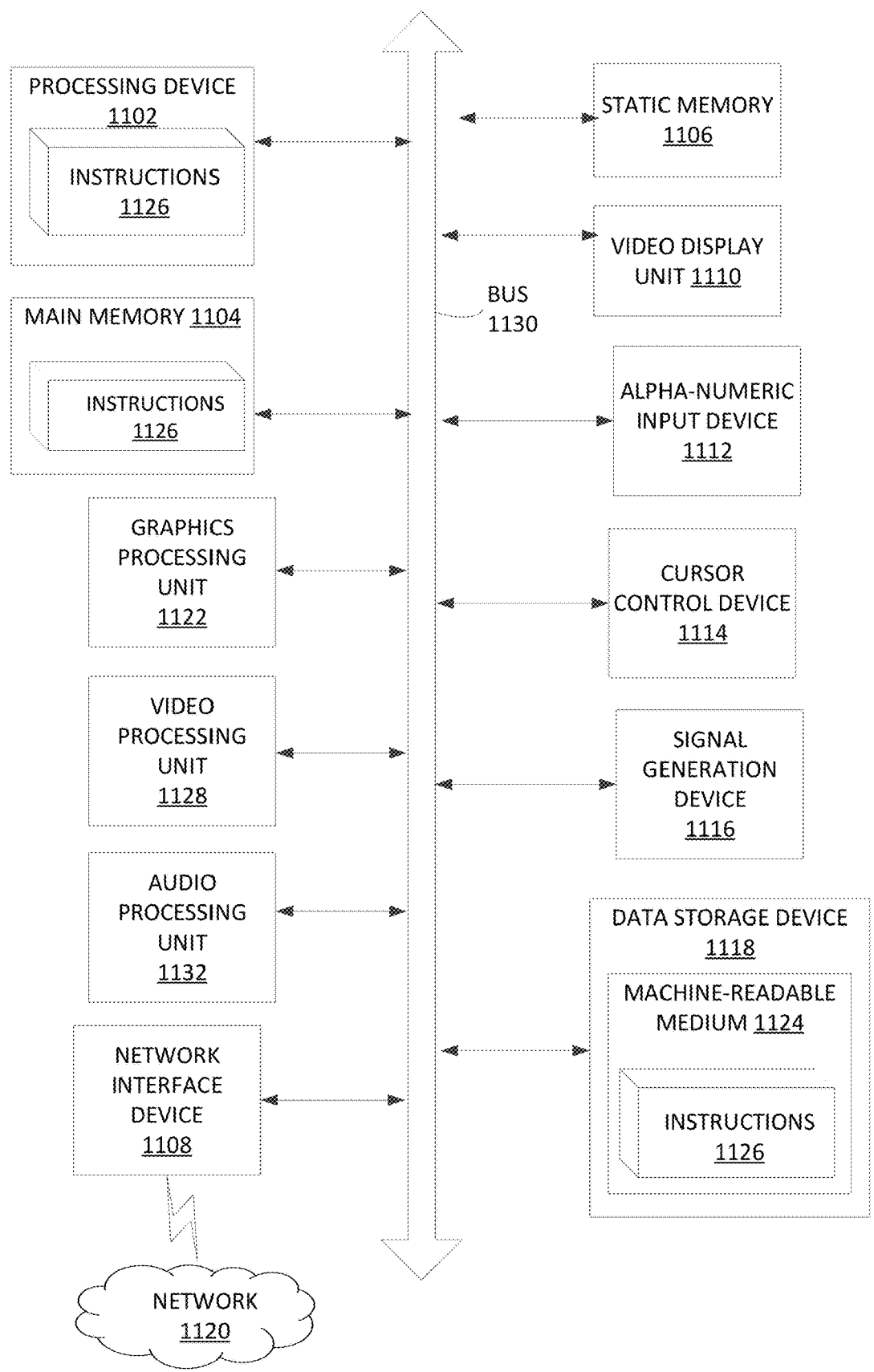
FIG. 11 illustrates another embodiment of a block diagram for a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The interrupt posting circuit 118 that sets the interrupt-arrived bits 136 and updates location information stored in the reporting data structures 119 can be implemented in computing system 1100.

The computing system 1100 includes a processing device 1102, main memory 1104 (e.g., read-only memory (ROM), flash memory, dynamic random access memory (DRAM) (such as synchronous DRAM (SDRAM) or DRAM (RDRAM), etc.) (e.g., main memory 130 of FIG. 1), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processor cores. The processing device 1102 is configured to execute the instructions 1126 (e.g., processing logic) for performing the operations discussed herein. In one embodiment, processing device 1102 can include the interrupt posting circuit 118 of FIG. 1. In another embodiment, processing device 1102 is processor 112 of FIG. 1. Alternatively, the computing system 1100 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1100 may further include a network interface device 1108 communicably coupled to a network 1120. The computing system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored instructions 1126 (e.g., software) embodying any one or more of the methodologies of functions described herein. The instructions 1126 (e.g., software) may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102 and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising a processor core; a processor cache to store reporting data structures comprising a queue structure; and interrupt posting circuit coupled to the processor core and the processing cache, wherein the interrupt posting circuit is to: receive an interrupt request directed to a virtual processor (VP) of a virtual machine (VM) executed by the processor core, wherein the VM is managed by a virtual machine monitor (VMM) executed by the processor core; determine the VP is in an inactive state; record the interrupt request in a first posted data structure allocated by the VMM for the VP in main memory coupled to the processor; and update location information stored in the reporting data structures based on recording the interrupt request in the first posted data structure to generate updated location information that identifies a location of the interrupt request.

In Example 2, the subject matter of Example 1, wherein the interrupt posting circuit and the reporting data structures are part of input-output memory management unit (IOMMU) circuitry, wherein the queue structure is an inactive posted interrupt descriptor (PID) reporting queue structure, wherein the first posted data structure is a first PID structure.

In Example 3, the subject matter of any one of Examples 1-2, wherein the interrupt posting circuit, to update the location information, is to update one or more of a pointer or an address stored in the queue structure based on the recording of the interrupt request, wherein the one or more of the pointer or the address identifies the location of the interrupt request.

In Example 4, the subject matter of any one of Examples 1-3, wherein the interrupt posting circuit is further to set an interrupt-arrived bit in the first posted data structure responsive to receiving the interrupt request and determining the VP is in the inactive state.

In Example 5, the subject matter of any one of Examples 1-4, wherein the reporting data structures further comprise a status register, wherein the interrupt posting circuit, to update the location information, is to set the status register to indicate that each interrupt-arrived bit of the main memory is to be read by the VMM to locate the interrupt request.

In Example 6, the subject matter of any one of Examples 1-5, wherein: the interrupt request is to be copied from the first posted data structure to schedule the VP responsive to the location of the interrupt request being identified; and the first posted data structure and the interrupt-arrived bit are to be cleared responsive to the interrupt request being copied from the first posted data structure.

In Example 7, the subject matter of any one of Examples 1-6, wherein the interrupt posting circuit is to: receive a second interrupt request directed to a second VP of a second VM executed by the processor core; determine the second VP is in the inactive state; record the second interrupt request in a second posted data structure allocated by the VMM for the second VP in the main memory; and update second location information stored in the reporting data structures based on recording the second interrupt request in the second posted data structure to generate second updated location information that identifies a second location of the second interrupt request.

Example 8 is a method comprising: receiving, by an interrupt posting circuit of a processor, an interrupt request directed to a virtual processor (VP) of a virtual machine (VM) executed by a processor core of the processor, wherein the VM is managed by a virtual machine monitor (VMM) executed by the processor core; determining, by the interrupt posting circuit, the VP is in an inactive state; recording, by the interrupt posting circuit, the interrupt request in a first posted data structure allocated by the VMM for the VP in main memory coupled to the processor; and updating, by the interrupt posting circuit, location information stored in reporting data structures of a processor cache of the processor, based on the recording of the interrupt request in the first posted data structure, to generate updated location information that identifies a location of the interrupt request.

In Example 9, the subject matter of Example 8, wherein the updating of the location information comprises updating, by the interrupt posting circuit, one or more of a pointer or an address stored in a queue structure of the reporting data structures based on the recording of the interrupt request, wherein the one or more of the pointer or the address identifies the location of the interrupt request.

In Example 10, the subject matter of any one of Examples 8-9, further comprising setting, by the interrupt posting circuit, an interrupt-arrived bit in the first posted data structure responsive to the receiving of the interrupt request and the determining that the VP is in the inactive state.

In Example 11, the subject matter of any one of Examples 8-10, wherein the reporting data structures further comprise a status register, wherein the updating of the location information comprises setting a status register of a queue structure of the reporting data structures to indicate that each interrupt arrived bit of the main memory is to be read by the VMM to locate the interrupt request.

In Example 12, the subject matter of any one of Examples 8-11, wherein: the interrupt request is to be copied from the first posted data structure to schedule the VP responsive to the location of the interrupt request being identified; and the first posted data structure and the interrupt-arrived bit are to be cleared responsive to the interrupt request being copied from the first posted data structure.

In Example 13, the subject matter of any one of Examples 8-12, further comprising: receiving, by the interrupt posting circuit, a second interrupt request directed to a second VP of a second VM executed by the processor core; determining, by the interrupt posting circuit, the second VP is in the inactive state; recording, by the interrupt posting circuit, the second interrupt request in a second posted data structure allocated by the VMM for the second VP in the main memory; and updating, by the interrupt posting circuit, second location information stored in the reporting data structures based on recording the second interrupt request in the second posted data structure to generate second updated location information that identifies a second location of the second interrupt request.

In Example 14, the subject matter of any one of Examples 8-13, wherein responsive to the location of the interrupt request being identified, the VP is to be changed from the inactive state to an active state and the interrupt request is to be provided to the VM.

Example 15 is a system comprising: a memory storing a first posted data structure; a processor coupled to the memory, wherein the processor comprises: a processor core; a processor cache to store reporting data structures comprising a queue structure; and an interrupt posting circuit to: receive an interrupt request directed to a virtual processor (VP) of a virtual machine (VM) executed by the processor core, wherein the VM is managed by a virtual machine monitor (VMM) executed by the processor core, wherein the first posted data structure is allocated by the VMM for the VP; determine the VP is in an inactive state; record the interrupt request in the first posted data structure; and update location information stored in the reporting data structures based on recording the interrupt request in the first posted data structure to generate updated location information that identifies a location of the interrupt request.

In Example 16, the subject matter of Example 15, wherein the interrupt posting circuit, to update the location information, is to update one or more of a pointer or an address stored in the queue structure based on the recording of the interrupt request, wherein the one or more of the pointer or the address identifies the location of the interrupt request.

In Example 17, the subject matter of any one of Examples 15-16, wherein the interrupt posting circuit is further to set an interrupt-arrived bit in the first posted data structure responsive to receiving the interrupt request and determining the VP is in the inactive state.

In Example 18, the subject matter of any one of Examples 15-17, wherein the reporting data structures further comprise a status register, wherein the interrupt posting circuit, to update the location information, is to set the status register to indicate that each interrupt-arrived bit of the memory is to be read by the VMM to locate the interrupt request.

In Example 19, the subject matter of any one of Examples 15-18, wherein: the interrupt request is to be copied from the first posted data structure to schedule the VP responsive to the location of the interrupt request being identified; and the first posted data structure and the interrupt-arrived bit are to be cleared responsive to the interrupt request being copied from the first posted data structure.

In Example 20, the subject matter of any one of Examples 15-19, wherein the interrupt posting circuit is to: receive a second interrupt request directed to a second VP of a second VM executed by the processor core; determine the second VP is in the inactive state; record the second interrupt request in a second posted data structure allocated by the VMM for the second VP in the memory; and update second location information stored in the reporting data structures based on recording the second interrupt request in the second posted data structure to generate second updated location information that identifies a second location of the second interrupt request.

Example 21 is a processor comprising: a processor core to, responsive to receiving one or more requests: allocate, in main memory coupled to the processor, a corresponding posted data structure for each virtual processor (VP) executed by the processor core, wherein each posted data structure comprises a corresponding interrupt-arrived bit; and responsive to determining that a first condition has occurred in the processor, identify a location of an interrupt request in a first posted data structure by reading the corresponding interrupt-arrived bit of each corresponding posted data structure in the main memory.

In Example 22, the subject matter of Example 21, wherein the one or more requests are made by a virtual machine monitor (VMM) executed by the processor core.

In Example 23, the subject matter of any one of Examples 21-22, wherein the processor core is further to, responsive to receiving the one or more requests: determine whether the first condition has occurred in the processor by determining whether a status register of reporting data structures of a processor cache of the processor is set; and responsive to determining that the first condition has not occurred in the processor, identify the location of the interrupt request in the first posted data structure by reading one or more of a pointer or an address in a queue structure of the reporting data structures.

In Example 24, the subject matter of any one of Examples 21-23, wherein responsive to identifying the location of the interrupt request, the processor core is to: copy the interrupt request from the first posted data structure to a scheduler queue of a VMM scheduler; clear the first posted data structure and a first interrupt-arrived bit of the first posted data structure; cause the VP to change from an inactive state to an active state; and provide the interrupt request from the scheduler queue to the VM.

Example 25 is an apparatus comprising means to perform a method of any one of Examples 8-14.

Example 26 is at least one machine readable medium comprising a plurality of instructions, when executed, to implement a method or realize an apparatus of any one of Examples 8-14.

Example 27 is an apparatus comprising a processor configured to perform the method of any one of Examples 8-14.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler embodiments, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible embodiments of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "recording," "updating," "locating," "scheduling," "copying," "clearing," "allocating," "setting," "reading," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a processor core;
    a processor cache to store reporting data structures comprising a queue structure; and
    an interrupt posting circuit coupled to the processor core and the processing cache, wherein the interrupt posting circuit is to:
        receive an interrupt request directed to a virtual processor (VP) of a virtual machine (VM) executed by the processor core, wherein the VM is managed by a virtual machine monitor (VMM) executed by the processor core;
        determine the VP is in an inactive state;
        record the interrupt request in a first posted data structure of a plurality of posted data structures, the first posted data structure allocated by the VMM for the VP in main memory coupled to the processor; and
        based at least in part on recording the interrupt request in the first posted data structure, update location information stored in the reporting data structures to generate updated location information that identifies a location of the interrupt request in the plurality of posted data structures.

2. The processor of claim 1, wherein the interrupt posting circuit and the reporting data structures are part of input-output memory management unit (IOMMU) circuitry, wherein the queue structure is an inactive posted interrupt descriptor (PID) reporting queue structure, wherein the first posted data structure is a first PID structure.

3. The processor of claim 1, wherein the interrupt posting circuit, to update the location information, is to update one or more of a pointer or an address stored in the queue structure based on the recording of the interrupt request, wherein the one or more of the pointer or the address identifies the location of the interrupt request in the plurality of posted data structures.

4. The processor of claim 1, wherein the interrupt posting circuit is further to set an interrupt-arrived bit in the first posted data structure responsive to receiving the interrupt request and determining the VP is in the inactive state.

5. The processor of claim 4, wherein the reporting data structures further comprise a status register, wherein the interrupt posting circuit, to update the location information, is to set the status register to indicate that each interrupt-arrived bit of the main memory is to be read by the VMM to locate the interrupt request.

6. The processor of claim 4, wherein:
    the interrupt request is to be copied from the first posted data structure to schedule the VP responsive to the location of the interrupt request being identified; and
    the first posted data structure and the interrupt-arrived bit are to be cleared responsive to the interrupt request being copied from the first posted data structure.

7. The processor of claim 1, wherein the interrupt posting circuit is to:
    receive a second interrupt request directed to a second VP of a second VM executed by the processor core;
    determine the second VP is in the inactive state;
    record the second interrupt request in a second posted data structure of the plurality of posted data structures, the second posted data structure allocated by the VMM for the second VP in the main memory; and
    based at least in part on recording the second interrupt request in the second posted data structure, update second location information stored in the reporting data structures to generate second updated location information that identifies a location of the second interrupt request in the plurality of posted data structures.

8. A method comprising:
  receiving, by an interrupt posting circuit of a processor, an interrupt request directed to a virtual processor (VP) of a virtual machine (VM) executed by a processor core of the processor, wherein the VM is managed by a virtual machine monitor (VMM) executed by the processor core;
  determining, by the interrupt posting circuit, the VP is in an inactive state;
  recording, by the interrupt posting circuit, the interrupt request in a first posted data structure of a plurality of posted data structures, the first posted data structure allocated by the VMM for the VP in main memory coupled to the processor; and
  based at least in part on the recording of the interrupt request in the first posted data structure, updating, by the interrupt posting circuit, location information stored in reporting data structures of a processor cache of the processor to generate updated location information that identifies a location of the interrupt request in the plurality of posted data structures.

9. The method of claim 8, wherein the updating of the location information comprises updating, by the interrupt posting circuit, one or more of a pointer or an address stored in a queue structure of the reporting data structures based on the recording of the interrupt request, wherein the one or more of the pointer or the address identifies the location of the interrupt request in the plurality of posted data structures.

10. The method of claim 8 further comprising setting, by the interrupt posting circuit, an interrupt-arrived bit in the first posted data structure responsive to the receiving of the interrupt request and the determining that the VP is in the inactive state.

11. The method of claim 10, wherein the reporting data structures further comprise a status register, wherein the updating of the location information comprises setting a status register of a queue structure of the reporting data structures to indicate that each interrupt arrived bit of the main memory is to be read by the VMM to locate the interrupt request.

12. The method of claim 10, wherein:
  the interrupt request is to be copied from the first posted data structure to schedule the VP responsive to the location of the interrupt request being identified; and
  the first posted data structure and the interrupt-arrived bit are to be cleared responsive to the interrupt request being copied from the first posted data structure.

13. The method of claim 8 further comprising:
  receiving, by the interrupt posting circuit, a second interrupt request directed to a second VP of a second VM executed by the processor core;
  determining, by the interrupt posting circuit, the second VP is in the inactive state;
  recording, by the interrupt posting circuit, the second interrupt request in a second posted data structure of the plurality of posted data structures, the second posted data structure allocated by the VMM for the second VP in the main memory; and
  updating, by the interrupt posting circuit, second location information stored in the reporting data structures based on recording the second interrupt request in the second posted data structure to generate second updated location information that identifies a location of the second interrupt request in the plurality of posted data structures.

14. The method of claim 8, wherein responsive to the location of the interrupt request being identified, the VP is to be changed from the inactive state to an active state and the interrupt request is to be provided to the VM.

15. A system comprising:
  a memory storing a plurality of posted data structures including a first posted data structure;
  a processor coupled to the memory, wherein the processor comprises:
    a processor core;
    a processor cache to store reporting data structures comprising a queue structure; and
    an interrupt posting circuit to:
      receive an interrupt request directed to a virtual processor (VP) of a virtual machine (VM) executed by the processor core, wherein the VM is managed by a virtual machine monitor (VMM) executed by the processor core, wherein the first posted data structure is allocated by the VMM for the VP;
      determine the VP is in an inactive state;
      record the interrupt request in the first posted data structure; and
      based at least in part on recording the interrupt request in the first posted data structure, update location information stored in the reporting data structures to generate updated location information that identifies a location of the interrupt request in the plurality of posted data structures.

16. The system of claim 15, wherein the interrupt posting circuit, to update the location information, is to update one or more of a pointer or an address stored in the queue structure based on the recording of the interrupt request, wherein the one or more of the pointer or the address identifies the location of the interrupt request in the plurality of posted data structures.

17. The system of claim 15, wherein the interrupt posting circuit is further to set an interrupt-arrived bit in the first posted data structure responsive to receiving the interrupt request and determining the VP is in the inactive state.

18. The system of claim 17, wherein the reporting data structures further comprise a status register, wherein the interrupt posting circuit, to update the location information, is to set the status register to indicate that each interrupt-arrived bit of the memory is to be read by the VMM to locate the interrupt request.

19. The system of claim 17, wherein:
  the interrupt request is to be copied from the first posted data structure to schedule the VP responsive to the location of the interrupt request being identified; and
  the first posted data structure and the interrupt-arrived bit are to be cleared responsive to the interrupt request being copied from the first posted data structure.

20. The system of claim 15, wherein the interrupt posting circuit is to:
  receive a second interrupt request directed to a second VP of a second VM executed by the processor core;
  determine the second VP is in the inactive state;
  record the second interrupt request in a second posted data structure of the plurality of posted data structures, the second posted data structure allocated by the VMM for the second VP in the memory; and
  update second location information stored in the reporting data structures based on recording the second interrupt request in the second posted data structure to generate second updated location information that identifies a location of the second interrupt request in the plurality of posted data structures.

21. A processor comprising:
a processor core to, responsive to receiving one or more requests:
  allocate, in main memory coupled to the processor, a plurality of posted data structures comprising a corresponding posted data structure for each virtual processor (VP) executed by the processor core, wherein each posted data structure comprises a corresponding interrupt-arrived bit; and
  responsive to determining that a first condition has occurred in the processor, identify a location of an interrupt request in a first posted data structure by reading the corresponding interrupt-arrived bit of each corresponding posted data structure in the main memory.

22. The processor of claim 21, wherein the one or more requests are made by a virtual machine monitor (VMM) executed by the processor core.

23. The processor of claim 21, wherein the processor core is further to, responsive to receiving the one or more requests:
  determine whether the first condition has occurred in the processor by determining whether a status register of reporting data structures of a processor cache of the processor is set; and
  responsive to determining that the first condition has not occurred in the processor, identify the location of the interrupt request in the plurality of posted data structures by reading one or more of a pointer or an address in a queue structure of the reporting data structures.

24. The processor of claim 21, wherein responsive to identifying the location of the interrupt request, the processor core is to:
  copy the interrupt request from the first posted data structure to a scheduler queue of a VMM scheduler;
  clear the first posted data structure and a first interrupt-arrived bit of the first posted data structure;
  cause the VP to change from an inactive state to an active state; and
  provide the interrupt request from the scheduler queue to the VM.

* * * * *